US012035239B2

United States Patent
Wu et al.

(10) Patent No.: US 12,035,239 B2
(45) Date of Patent: *Jul. 9, 2024

(54) METHOD AND APPARATUS FOR MONITORING PHYSICAL DOWNLINK CONTROL CHANNEL

(71) Applicant: Samsung Electronics Co., Ltd., Suwon-si (KR)

(72) Inventors: Min Wu, Beijing (CN); Feifei Sun, Beijing (CN); Jingxing Fu, Beijing (CN); Bin Yu, Beijing (CN); Qi Xiong, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,387

(22) Filed: Mar. 24, 2022

(65) Prior Publication Data

US 2022/0217633 A1 Jul. 7, 2022

Related U.S. Application Data

(63) Continuation of application No. 16/740,287, filed on Jan. 10, 2020, now Pat. No. 11,290,958.

(30) Foreign Application Priority Data

Jan. 10, 2019 (CN) .......................... 201910024436.7
Apr. 30, 2019 (CN) .......................... 201910365095.X

(51) Int. Cl.
*H04W 52/02* (2009.01)
*H04B 7/0413* (2017.01)
(Continued)

(52) U.S. Cl.
CPC ...... *H04W 52/0229* (2013.01); *H04B 7/0413* (2013.01); *H04L 5/0092* (2013.01);
(Continued)

(58) Field of Classification Search
CPC ......... H04W 52/0229; H04W 52/0235; H04W 72/042; H04W 76/11; H04W 76/27;
(Continued)

(56) References Cited

U.S. PATENT DOCUMENTS 8,520,578 B2   8/2013  Rayment et al.
2006/0083186 A1  4/2006  Handforth et al.
(Continued)

FOREIGN PATENT DOCUMENTS

CN   101801090 A    8/2010
CN   103384394 A    11/2013
(Continued)

OTHER PUBLICATIONS

3GPP TSG RAN WG1 Meeting #90; R1-1712806, Source: Qualcomm Incorporated; Title: Efficient monitoring of DL control channels; Prague, Czechia, Aug. 21-25, 2017. (Year: 2017).*
(Continued)

*Primary Examiner* — Mohammed S Chowdhury

(57) ABSTRACT

Embodiments of the disclosure provides a method and an apparatus for power saving operation in a wireless communication system, wherein the method comprises: receiving configuration information for the power saving operation; monitoring a power saving signal based on the configuration information; and determining whether to monitor a PDCCH based on the power saving signal.

16 Claims, 15 Drawing Sheets

(51) Int. Cl.
| | |
|---|---|
| *H04L 5/00* | (2006.01) |
| *H04W 72/23* | (2023.01) |
| *H04W 76/11* | (2018.01) |
| *H04W 76/27* | (2018.01) |
| *H04W 76/28* | (2018.01) |

(52) U.S. Cl.
CPC ....... *H04W 52/0235* (2013.01); *H04W 72/23* (2023.01); *H04W 76/11* (2018.02); *H04W 76/27* (2018.02); *H04W 76/28* (2018.02)

(58) Field of Classification Search
CPC ............. H04W 76/28; H04W 52/0219; H04W 52/028; H04W 52/0216; H04B 7/0413; H04L 5/0092; Y02D 30/70
See application file for complete search history.

(56) References Cited

U.S. PATENT DOCUMENTS

| | | | |
|---|---|---|---|
| 2011/0170526 | A1 | 7/2011 | Hsieh et al. |
| 2014/0254452 | A1 | 9/2014 | Golitschek Edler Von Elbwart et al. |
| 2015/0003311 | A1 | 1/2015 | Feuersaenger et al. |
| 2015/0208462 | A1* | 7/2015 | Lee ................. H04W 72/23 370/311 |
| 2016/0029309 | A1 | 1/2016 | Kim |
| 2016/0308755 | A1 | 10/2016 | Garg |
| 2018/0054800 | A1* | 2/2018 | Yeo ................. H04L 27/2657 |
| 2018/0145800 | A1 | 5/2018 | Srivastav et al. |
| 2018/0270869 | A1* | 9/2018 | Tsai ................. H04W 74/006 |
| 2020/0029274 | A1 | 1/2020 | Cheng et al. |
| 2020/0037396 | A1 | 1/2020 | Islam et al. |
| 2020/0092814 | A1 | 3/2020 | Zhou et al. |
| 2020/0100179 | A1* | 3/2020 | Zhou ................. H04W 72/042 |
| 2020/0107266 | A1 | 4/2020 | Liao et al. |
| 2020/0245303 | A1* | 7/2020 | Hwang ............. H04W 52/0216 |
| 2021/0259044 | A1* | 8/2021 | Islam ................ H04W 52/0235 |
| 2022/0086659 | A1* | 3/2022 | Wang ................ H04W 52/0235 |
| 2023/0108344 | A1* | 4/2023 | Shen .................. H04L 5/0053 370/311 |

FOREIGN PATENT DOCUMENTS

| | | | |
|---|---|---|---|
| CN | 108781411 A | | 11/2018 |
| EP | 2552065 B1 | | 4/2018 |
| EP | 3788822 B1 | | 8/2022 |
| KR | 10-2017-0128231 A | | 11/2017 |
| WO | 2016/148752 A1 | | 9/2016 |
| WO | 2020146499 A1 | | 7/2020 |
| WO | WO-2020146499 A1 * | 7/2020 | ............ H04L 5/0032 |

OTHER PUBLICATIONS

3GPP TSG RAN WG2 NR #99; R2-1709652; Source: Qualcomm Incorporated, Apple, OPPO; Title: Wake-Up Signaling for C-DRX Mode; Aug. 21-25, 2017 (Year: 2017).*
European Search Report dated Apr. 8, 2022 in connection with European Patent Application No. 21218336.2, 8 pages.
3GPP TSG RAN WG1; Meeting #95; R1-1812232 Spokane, USA, Nov. 12-16, 2018 (Year: 2018).
3GPP TSG-RAN WG1; Meeting #95; R1-1813183; Spokane, USA, Nov. 12-16, 2018 (Year: 2018).
Notification of Transmittal of the International Search Report and the Written Opinion of the International Searching Authority, or the Declaration dated Apr. 13, 2020 in connection with International Patent Application No. PCT/KR2020/000120, 10 pages.
Notification of Transmittal of the International Search Report and the Written Opinion of the International Searching Authority, or the Declaration dated Apr. 13, 2020 in connection with International Patent Application No. PCT/KR2020/000269, 10 pages.
CATT, "Offline Discussion on UE Power Saving Schemes", 3GPP TSG RAN WG1 Meeting #95, Nov. 12-16, 2018, R1-1814093, 4 pages.
LG Electronics, "Discussion on power saving for DRX operation", 3GPP TSG RAN WG1 Meeting #95, Nov. 12-16, 2018, R1-1812590, 4 pages.
LG Electronics, "Discussion on power saving for PDCCH monitoring", 3GPP TSG RAN WG1 Meeting #95, Nov. 12-16, 2018, R1-1812592, 3 pages.
CATT, "US Power saving schemes with power saving signal/channel/procedures", 3GPP TSG RAN WG1 Meeting #95, Nov. 12-16, 2018, R1-1812642, 10 pages.
Vivo, "NR UE power saving", 3GPP TSG RAN WG1 Meeting #92bis, Apr. 16-20, 2018, R1-1803860, 5 pages.
InterDigital, Inc., "Discussion on Power Saving Techniques", 3GPP TSG RAN WG1 Meeting #95, Nov. 12-16, 2018, R1-1813243, 5 pages.
European Search Report dated May 29, 2020 in connection with European Patent Application No. 20 15 0894, 10 pages.
China National Intellectual Property Administration, "The First Office Action," dated Apr. 10, 2023, in connection with Chinese Patent Application No. 201910365095.X, 22 pages.
Qualcomm Incorporated, "UE Power Evaluation for DRX with Wake-Up Signaling," R1-1612068, 3GPP TSG-RAN WG1 #87, Nov. 14-18, 2016, Reno, USA, 7 pages.
Notice of Allowance dated Sep. 28, 2023, in connection with Chinese Patent Application No. 201910365095.X, 7 pages.
Qualcomm Incorporated, "Physical Downlink Control Channels," 3GPP TSG RAN WG1 #82 BIS, R1-155705, Malmo, Sweden, Oct. 2015, 9 pages.
Communication pursuant to Article 94(3) EPC dated May 16, 2024, in connection with European Patent Application No. 21218336.2, 5 pages.

* cited by examiner

METHOD AND APPARATUS FOR MONITORING PHYSICAL DOWNLINK CONTROL CHANNEL

CROSS-REFERENCE TO RELATED APPLICATIONS

This application is a continuation of application Ser. No. 16/740,287, filed Jan. 10, 2020, which is based on and claims priority under 35 U.S.C. § 119 to Chinese Patent Application No. 201910024436.7 filed on Jan. 10, 2019, and Chinese Patent Application No. 201910365095.X filed on Apr. 30, 2019, in the Chinese Patent Office, the disclosures of which are incorporated by reference herein in their entirety.

BACKGROUND

1. Field

The disclosure relates to a field of communication technologies, and in particular, to a UE, method and apparatus for monitoring a physical downlink control channel.

2. Description of the Related Art

In wireless mobile communication systems, it has always been an important research direction for reducing power consumption of UEs and accordingly extending battery duration. In the 5G NR system, due to large bandwidth transmission and a beam sweeping mechanism at high frequencies, the power consumption of the UE is more serious than that of the 4G LTE system. In order to achieve less power consumption than the 4G LTE UE, the power saving research is particularly important. In Rel-16 NR SID (Study Item Description), one of the researches focuses on the power saving technology of 5G UE.

In the prior art, Discontinuous Reception (DRX) is an effective power saving method. This method allows the UE to periodically enter a sleep mode at certain times without monitoring the physical downlink control channel (PDCCH). When the PDCCH needs to be monitored, the UE wakes up from the sleep mode, so that the UE can save power. Although it has a certain impact on the delay of data transmission, if this delay does not affect user experience, it is meaningful to implement DRX in consideration of the power consumption being more important to the UE.

When DRX is used in the connected mode, each DRX cycle includes an On-Duration and an Opportunity-for-DRX. The UE needs to monitor the PDCCH during the On-Duration, and the UE does not need to monitor the PDCCH during the Opportunity-for-DRX. The UE wakes up at the starting position of the On-Duration of each DRX cycle to start the drx-onDurationTimer, that is, to start to monitor the PDCCH. However, in actual applications, the dynamic data service of the UE is difficult to completely match the DRX cycle configured by a higher layer, that is, the UE does not have data transmission for all the On-Durations of the DRX cycles, and the UE would have a certain power consumption when monitoring the PDCCH during the On-Duration of each DRX cycle.

In addition, once the UE enters the On-Duration of the DRX cycle, as long as the UE has monitored the scheduling of the new data, the dre-InactivityTimer is started or reboot, that is, the On-Duration can be continuously extended by the drx-InactivityTimer, and the UE is able to stop the monitoring of the PDCCH only after the expiration of both the drx-onDurationTimer and the drx-InactivityTimer, that is, to enter the Opportunity-for-DRX. In fact, the drx-onDuration-Timer or drx-InactivityTimer configured by the higher layer does not match the dynamic data service of the UE well, that is, the base station may only schedule the UE for a small first portion of the time of the On-Duration and may not schedule the UE for the subsequent time of the On-Duration. If the base station determines that the UE will not be scheduled again, the base station may transmit a DRX command MAC CE to the UE to indicate the UE to enter the Opportunity-for-DRX in advance, but the MAC layer signaling has a certain time Delay, so there is still some optimization.

When the DRX is used in the RRC idle mode or the in-active mode, the UE periodically wakes up to monitor the PDCCH at each paging occasion (PO), but in fact, not every PO will have a paging message, and if the UE is waked up in each PO to monitor the PDCCH, it would cause a certain power consumption. In addition, many UEs would monitor the same PO, but the PO may only page one of the UEs or several UEs. The probability that the UE monitors a paging message that does not belong to itself is very high, which will cause a certain power consumption to the UE.

SUMMARY

It is an aspect to address at least the above-mentioned problems and/or disadvantages and to provide at least the advantages described below.

According to an embodiment, there is provided a method of power saving operation by a user equipment (UE) in a wireless communication system, comprising: receiving configuration information for the power saving operation; monitoring a first PDCCH based on the configuration information; receiving a power saving signal based on the first PDCCH; and determining whether to monitor a second PDCCH based on the power saving signal.

According to an embodiment, the power saving signal is received based on a Downlink Control Information (DCI) using a Power Saving-Radio Network Temporary Identifier (PS-RNTI), and the PS-RNTI is obtained by radio resource control (RRC) signaling.

According to an embodiment, the method further comprises starting of a discontinuous reception (DRX) on duration timer after a predetermined time gap from a receiving point of the power saving signal.

According to an embodiment, the DCI comprises at least one of information related to the power saving signal, information related to bandwidth part (BWP) to be activated, multiple input multiple output (MIMO) layer information, antenna information, search space related to the second PDCCH, Control Resource Set (CORESET), or monitoring periodicity.

According to an embodiment, the power saving signal includes a wake up signal (WUS), and wherein the method further comprises monitoring the second PDCCH based on the WUS.

According to an embodiment, the power saving signal includes a go to sleep signal (GTTS), and the determining of whether to monitor the second PDCCH further comprises: determining not to perform monitoring of the second PDCCH based on the GTTS.

According to an embodiment, the power saving signal includes information for skipping monitoring of at least one second PDCCH occasion, and wherein the method further comprises skipping the monitoring of the at least one PDCCH occasion based on the information.

According to an embodiment, the DCI is a UE specific DCI or a group specific DCI.

According to an embodiment, the first PDCCH is detected on the active downlink bandwidth part (DL BWP).

According to an embodiment, there is provided a user equipment (UE) performing power saving operation in a wireless communication system, comprising: a transceiver; and at least one processor coupled with the transceiver and configured to: receive configuration information for the power saving operation, monitor a first PDCCH based on the configuration information, receive a power saving signal based on the first PDCCH, and determine whether to monitor a second PDCCH based on the power saving signal.

According to an embodiment, the at least one processor is further configured to start a discontinuous reception (DRX) on duration timer after a predetermined time gap from a receiving point of the power saving signal.

According to an embodiment, the power saving signal includes a wake up signal (WUS), and wherein the at least one processor is further configured to monitor the second PDCCH based on the WUS.

Additional aspects and/or advantages of the general inventive concept will be set forth in part in the description, and some will be clear by description or can be learned by implementation of the overall concept of the disclosure.

BRIEF DESCRIPTION OF THE DRAWINGS

The above and other advantages of the embodiments will be more clearly understood from the following description taken in conjunction with the accompanying drawings, in which.

DETAILED DESCRIPTION

Figure 1:
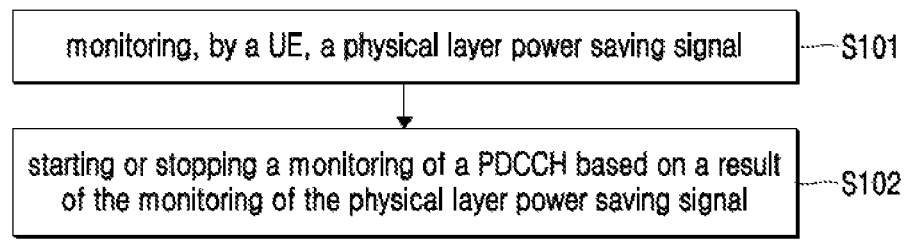
FIG. 1 is a schematic flowchart of a method for monitoring a PDCCH according to an embodiment of the disclosure.

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit", "manager", "engine", or "device" may refer to a unit which processes at least one function or operation and may be implemented by hardware, software, or a combination of hardware and software.

It should be understood by a person of ordinary skill in the art that term "UE" and "UE apparatus" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "UE" and "UE apparatus" as used herein may be portable, transportable, mountable in transportations (air, sea and/or land transportations), or suitable and/or configured to run locally and/or distributed in other places in the earth and/or space for running. The "UE" or "UE apparatus" as used herein may be a communication UE, an internet UE, a music/video player UE. For example, it may be a PDA, a Mobile Internet Device (MID) and/or a mobile phone with a music/video playback function, or may be apparatuses such as a smart TV and a set-top box.

Before describing the embodiments of the present disclosure in detail, the prior art of monitoring the PDCCH will be introduced.

Discontinuous Reception (DRX) is an effective power saving method. This method allows the UE to periodically enter a sleep mode at certain times without monitoring the PDCCH. When the PDCCH needs to be monitored, the UE wakes up from the sleep mode, so that the UE can save power. Although it has a certain impact on the delay of data transmission, if this delay does not affect user experience, it is meaningful to implement DRX in consideration of the power consumption being more important to the UE.

When DRX is used in the connected mode, each DRX cycle includes an On-Duration and an Opportunity-for-DRX. The UE needs to monitor the PDCCH during the On-Duration, and the UE does not need to monitor the PDCCH during the Opportunity-for-DRX. The UE wakes up at the starting position of the On-Duration of each DRX cycle to start the drx-onDurationTimer, that is, to start to monitor the PDCCH. However, in actual applications, the dynamic data service of the UE is difficult to completely match the DRX cycle configured by a higher layer, that is, the UE does not have data transmission for all the On-Durations of the DRX cycles, and the UE would have a certain power consumption when monitoring the PDCCH during the On-Duration of each DRX cycle.

In addition, once the UE enters the On-Duration of the DRX cycle, as long as the UE has monitored the scheduling of the new data, the drx-InactivityTimer is started or reboot, that is, the On-Duration can be continuously extended by the drx-InactivityTimer, and the UE is able to stop the monitoring of the PDCCH only after the expiration of both the drx-onDurationTimer and the drx-InactivityTimer, that is, to enter the Opportunity-for-DRX. In fact, the drx-onDurationTimer or drx-InactivityTimer configured by the higher layer does not match the dynamic data service of the UE well, that is, the base station may only schedule the UE for a small first portion of the time of the On-Duration and may not schedule the UE for the subsequent most of the time of the On-Duration. If the base station determines that the UE will not be scheduled again, the base station may transmit a DRX command MAC CE to the UE to indicate the UE to enter the Opportunity-for-DRX in advance, but the MAC layer signaling has a certain time Delay, so there is still some room for optimization.

When the DRX is used in the RRC idle mode or the in-active mode, the UE periodically wakes up to monitor the PDCCH at each paging occasion (PO), but in fact, not every PO will have a paging message, and if the UE waked up in each PO to monitor the PDCCH, it would cause a certain power consumption. In addition, many UEs would monitor the same PO, but the PO may only page one of the UEs or several UEs. The probability that the UE monitors a paging message that does not belong to itself is very high, which will cause a certain power consumption to the UE.

The embodiments of the disclosure provide a UE, method and computer storage medium for monitoring a physical downlink control channel with respect to the problems existed in the prior art.

In the embodiment of the present application, the physical layer power saving signal may be a physical layer power saving signal or a physical layer power saving signaling. The physical layer power saving signal may be any of the following signal: Wake Up Signal (WUS), Go To Sleep Signal (GTSS), PDCCH Skipping Signal (PDCCH SS), PDCCH monitoring signal (PDCCH MS), Power Saving Signal, Power Saving Channel, Power Saving Signaling, and the like.

FIG. 1 is a schematic flowchart of a method for monitoring a PDCCH according to an embodiment of the disclosure.

An embodiment of the disclosure provides a method for monitoring a PDCCH, as shown in FIG. 1, including:

Step S101, monitoring, by a UE, a physical layer power saving signal;

Step S102: start or stop a monitoring of the PDCCH based on a result of the monitoring of the physical layer power saving signal.

Specifically, when the UE receives the configuration information of the physical layer power saving signal transmitted by the base station, wherein the physical layer power saving signal is used to perform a specific power saving operation, and then the UE monitors the physical layer power saving signal on the preconfigured time frequency resource, and performs a corresponding power saving operation based on whether the physical layer power saving signal is monitored, for example, starts monitoring the PDCCH while waking up from the sleep mode, or stops monitoring the PDCCH and enters the sleep mode. Wherein, the physical layer power saving signal is a power saving signal carried by a physical layer dedicated signal sequence or a reference signal (RS) sequence, and the physical layer power saving signaling is a power saving signal carried by the downlink control information (DCI).

The physical layer power saving signal carries 1 bit of information by transmitting or not transmitting to indicate the UE to perform a corresponding power saving operation, that is, the UE performs an operation when the power saving signal has been monitored, and when the power saving signal has not been monitored, another operation is performed. The physical layer power saving signal can be implemented by a sequence, such as a PN sequence, ZC sequence, M sequence or a Gold sequence, etc., or can be implemented based on an existing reference signal in a 5G NR system, such as Channel Status Information Reference Signal (CSI-RS), Demodulation Reference Signal (DMRS), Tracking Reference Signal (TRS), Phase Tracking Reference Signal (PTRS), Primary Synchronization Signal (PSS) and Secondary Synchronization Signal (SSS) and the like.

In practical applications, the base station has three working modes: RRC connected mode, RRC in-active mode, and RRC idle mode. When the base station is in the RRC connected mode, the UE may be configured with DRX or may not be configured with DRX. The following is a detailed description of each condition.

In a preferred embodiment of the present disclosure, when the UE is in the RRC connected mode and is configured with the DRX, starting or stopping the monitoring of the PDCCH based on the monitoring result of the physical layer power saving signal includes:

when the physical layer power saving signal is monitored, the drx-onDurationTimer is started at the starting position of the corresponding On-Duration.

Specifically, the UE being in the RRC connected mode is configured with the DRX, and the UE does not always have data scheduling during the On-Duration of each DRX cycle, if the base station will schedule the UE on a certain On-Duration, the base station may transmit a physical layer signal before the On-Duration to wake up the UE to monitor the PDCCH during the On-Duration. If the base station will not schedule the UE on a certain On-Duration, the base station will not transmit the physical layer signal. The physical layer signal may be referred to as a wake up signal (WUS), and the WUS is used to wake up the UE in the DRX sleep mode to monitor the PDCCH during the On-Duration, and further reduce the UE power consumption based on the DRX in the RRC connected mode.

If the UE is configured with the above WUS, the UE will monitor the corresponding WUS before the On-Duration of each DRX cycle. If the UE monitors the WUS, it will start the drx-onDurationTimer at the starting position of the corresponding On-Duration, that is, start monitoring the PDCCH. If the UE does not monitor the WUS, the UE does not need to start the drx-onDurationTimer at the starting position of the corresponding On-Duration, that is, there is no need to monitor the PDCCH.

It should be noted that the drx-onDurationTimer may be referred to as a "DRX On-Duration Timer", which may also be referred to as a "DRX Activation Timer", or other names. This application does not limit to this.

Figure 2:
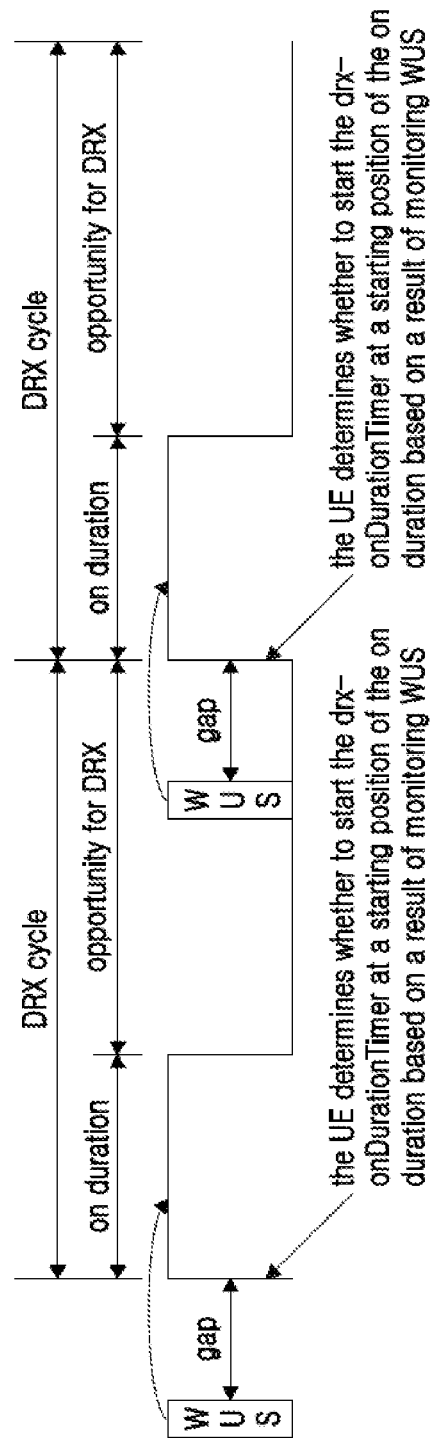
FIG. 2 is a schematic diagram of a WUS that can be used to wake up an DRX UE being in an RRC connected mode in an On-Duration to monitor PDCCH according to an embodiment of the disclosure.

FIG. 2 is a schematic diagram of the above-mentioned WUS for waking up the DRX UE in the RRC connected mode to monitor the PDCCH at the On-Duration. The UE periodically monitors the WUS, and determines whether to start the drx-onDurationTimer at the starting position of the corresponding On-Duration based on the monitoring result of the WUS, that is, to start monitoring the PDCCH.

In a preferred embodiment of the present disclosure, a first time gap is existed between the time of the UE receiving the physical layer power saving signal and the time of the UE starting the drx-onDurationTimer, and the UE determines the time domain position of the physical layer power saving signal based on the starting time of the On-Duration and the first time gap.

Specifically, in the time domain, there is a gap between the ending position of the WUS and the starting position of the corresponding On-Duration, as shown in FIG. 2, the gap is used to reserve the processing time of the UE for the WUS and the preparation time for starting the monitoring of the PDCCH, the preparation time for starting the monitoring of the PDCCH includes the warm up time of the internal circuit module of the UE and/or the time for the wireless channel synchronization.

The time domain of the WUS can be indicated by configuring the gap of the WUS and its corresponding On-Duration. That is, the UE determines the ending position of the WUS according to the starting position of the On-Duration and the configuration value of the gap. The starting position of the On-Duration is determined by the parameter drx-LongCycleStartOffset and drx-SlotOffset, and then the UE determines the starting position of the WUS according to the ending position of the WUS and the duration of the WUS.

Optionally, the minimum gap of the WUS and the On-Duration is specified, and the minimum gap is related to the UE capability, for example, related to the transition time of the UE from the Opportunity-for-DRX to the On-Duration, and the UE capability is related to different UE implementation manners, the UE should report this relevant capability to the base station. The base station should consider the capability reported by the UE when configuring the gap of the WUS and the On-Duration.

Optionally, the minimum gap of the WUS and the On-Duration supported by the UE is related to the subcarrier spacing. For example, the larger the subcarrier spacing used by the UE, the smaller the minimum gap of the WUS and On-Duration that the UE can support.

In a preferred embodiment of the present disclosure, the physical layer power saving signal corresponds to multiple DRX cycles, and starting or stopping a monitoring of the PDCCH based on the monitoring result of the physical layer power saving signal includes:

when the physical layer power saving signal is monitored, the drx-onDurationTimer is started at the starting position of the On-Duration of the corresponding multiple DRX cycles;

and/or, when the physical layer power saving signal is not monitored, the drx-onDurationTimer is not started at the starting position of the On-Duration of the corresponding multiple DRX cycles;

and/or, when the physical layer power saving signal is not monitored, the drx-onDurationTimer is not started at the starting position of the On-Duration within the first DRX cycle of the corresponding multiple DRX cycles.

Further, in FIG. 2, the On-Duration of each DRX cycle may correspond to one WUS, that is, the WUS and the On-Duration may be an one-to-one correspondence, and the UE monitors the corresponding WUS in each DRX cycle, and determines whether to start the drx-onDurationTimer at the starting position of the On-Duration of the DRX cycle based on the monitoring result of the WUS, that is, to start monitoring the PDCCH.

In one example, the system specifies that the WUS and the On-Duration are an one-to-one correspondence, and the WUS cycle is the same as the DRX cycle at this time.

Figure 3:
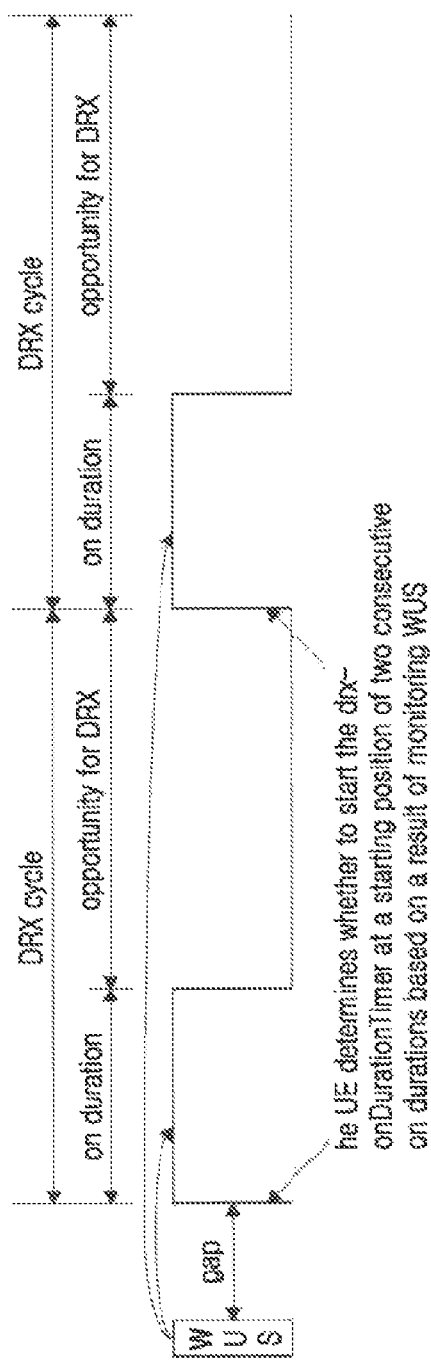
FIG. 3 is a schematic diagram of a WUS that can be used in an RRC connected mode according to an embodiment of the disclosure.

Further, FIG. 3 shows still another schematic diagram of the WUS in the RRC connected mode. In FIG. 3, the On-Durations of two consecutive DRX cycles correspond to one WUS, that is, the WUS and the On-Duration may also be an one-to-multiple correspondence. When the DRX cycle is relatively small, the one-to-multiple correspondence can further reduce the overall power consumption of the UE on the WUS detection and reduce the overall resource overhead of the WUS.

In FIG. 3, the UE monitors the corresponding WUS every two DRX cycles once, and determines whether to start the drx-onDurationTimer and start monitoring the PDCCH at the starting position of the On-Duration of the two consecutive DRX cycles based on the monitoring result of the WUS, if the UE monitors the WUS, the UE starts the drx-onDurationTimer at the starting position of the On-Duration of two consecutive DRX cycles, if the UE does not monitor the WUS, the UE can continuously sleep for two DRX cycles.

In an example, the system specifies that the WUS and the On-Duration can be configured as an one-to-multiple correspondence, that is, one WUS can correspond to N On-Durations, N is a configurable value (N≥1), and N can also be configured as 1. At this time, the WUS cycle is N times that of the DRX cycle.

In an example, the system specifies that the WUS and On-Duration can be configured as an one-to-multiple correspondence only when the DRX cycle value is less than a certain threshold, and when the DRX cycle value is greater than a certain threshold, the WUS and the On-Duration can only be an one-to-one correspondence.

In an example, the system limits the overall duration corresponding to one WUS, that is, when one WUS corresponds to N DRX cycles, the configurable maximum value of N is related to the DRX cycle value, for example, the configurable maximum value of N when the DRX cycle value is small, is greater than the configurable maximum value of N when the DRX cycle value is large.

Figure 4:
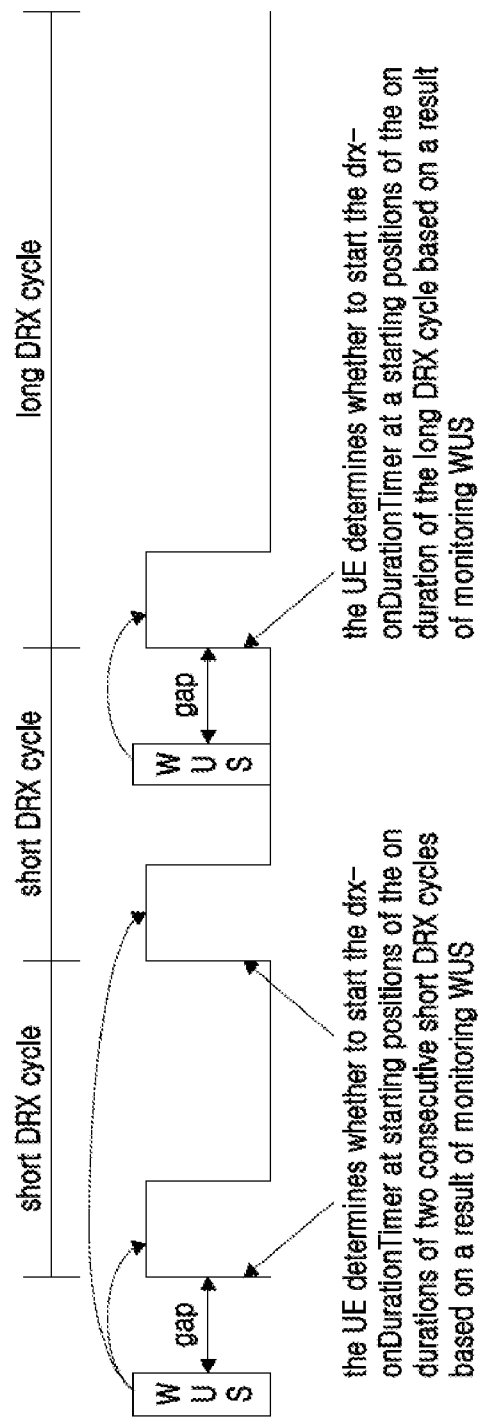
FIG. 4 is a schematic diagram of a WUS that can be used in an RRC connected mode according to an embodiment of the disclosure.

Further, FIG. 4 shows a schematic diagram of the WUS in the RRC connected mode. FIG. 4 is similar to the above FIG. 3, in other words, the On-Duration of the two consecutives DRX cycles corresponds to one WUS, but it is essentially different from FIG. 3 in specific use. In FIG. 3, regardless of whether the UE has monitored the WUS, the UE behavior performed by this monitoring result is applied to two consecutives On-Durations, but FIG. 4 is different.

In FIG. 4, if the UE does not monitor the WUS, the UE only skips the monitoring of the PDCCH in the On-Duration which is adjacent to the WUS, that is, does not start the drx-onDurationTimer, and the UE behavior performed by not monitoring the WUS is applied to only one On-Duration, and the UE still needs to monitor the corresponding WUS in the next On-Duration. From this UE behavior, the WUS and the On-Duration are one-to-one correspondence; if the UE has monitored the WUS, then the UE should start the drx-onDurationTimer at the starting positions of two consecutive On-Durations and monitor that the UE behavior performed by the WUS is applied to the two consecutive On-Durations. The UE does not need to monitor the corresponding WUS in the next On-Duration. From the UE behavior, the WUS and the On-Duration can be one-to-multiple correspondence, which also known as a Robust design.

The design of FIG. 4 has better robustness, so that the WUS transmitted by the base station is lost by the UE (Missed detection), for example, the UE loses the WUS due to poor SINR due to small-scale channel fading, and the base station will not respond to the scheduling of this UE in multiple corresponding DRX cycles. To alleviate the waste of resources caused by this situation, the UE can only skip the monitoring of the PDCCH in the first On-Duration and still monitor the WUS in the next On-Duration.

In the current DRX mechanism, the short DRX cycle may be optionally configured. If the short DRX cycle is configured, when the drx-onDurationTimer and/or drx-InactivityTimer expires or the DRX Command MAC CE is received, the UE firstly applies the short DRX cycle, and start the drx-ShortCycleTimer, and apply the long DRX cycle only when the drx-ShortCycleTimer expires or the Long DRX Command MAC CE is received. Since the long and short DRX cycles may be used alternately, the On-Duration does not occur at a fixed cycle, that is, the On-Duration does not have periodicity as a whole.

Figure 5:
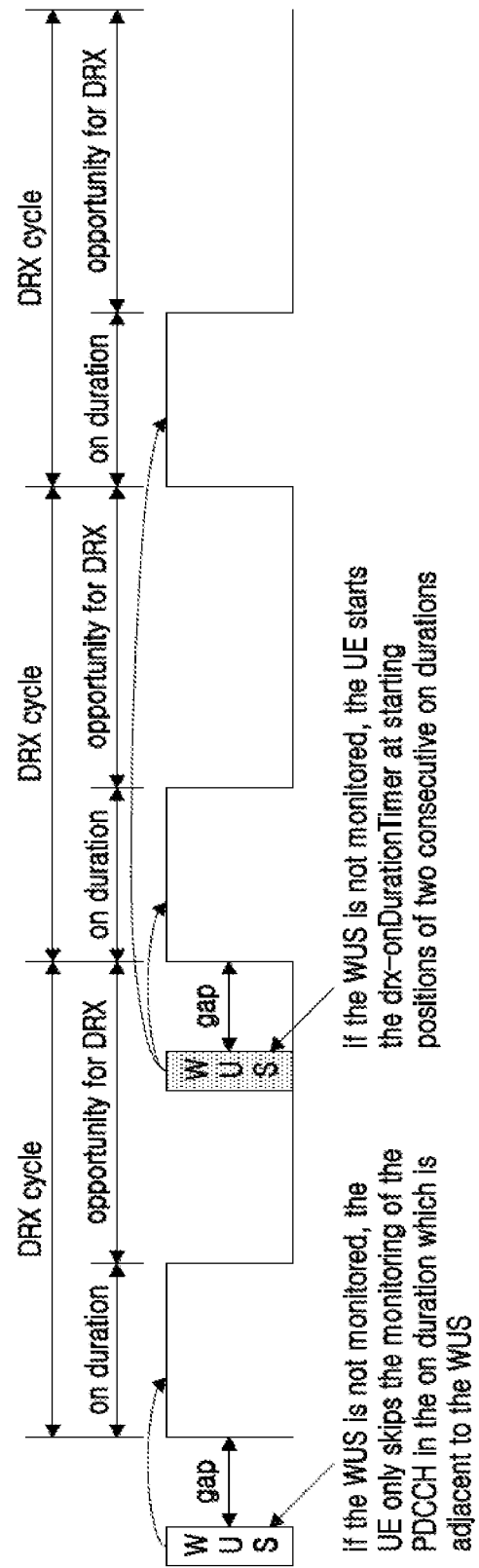
FIG. 5 is a schematic diagram of another WUS that can be used in an RRC connected mode according to an embodiment of the disclosure.

Further, FIG. 5 shows a schematic diagram of the WUS in the RRC connected mode. In FIG. 5, the UE is configured with a short DRX cycle, and regardless of whether the UE applies the short DRX cycle or the long DRX cycle, the WUS has an one-to-one correspondence with each On-Duration, that is, the UE monitors the WUS before each On-Duration, and determines whether to start the drx-onDurationTimer and start monitoring the PDCCH at the starting position of the corresponding On-Duration based on the monitoring result of the WUS.

In one example, the system specifies that when the WUS and the On-Duration are configured in an one-to-one correspondence and a short DRX cycle is configured, regardless the UE applies a short DRX cycle or a long DRX cycle, the WUS has an one-to-one correspondence with each On-Duration. At this time, the WUS is similar to the On-Duration, the WUS does not have periodicity as a whole.

In a preferred embodiment of the present disclosure, the physical layer power saving signal corresponds to multiple DRX cycles, and the multiple DRX cycles are configured with a short DRX cycle.

Figure 6:
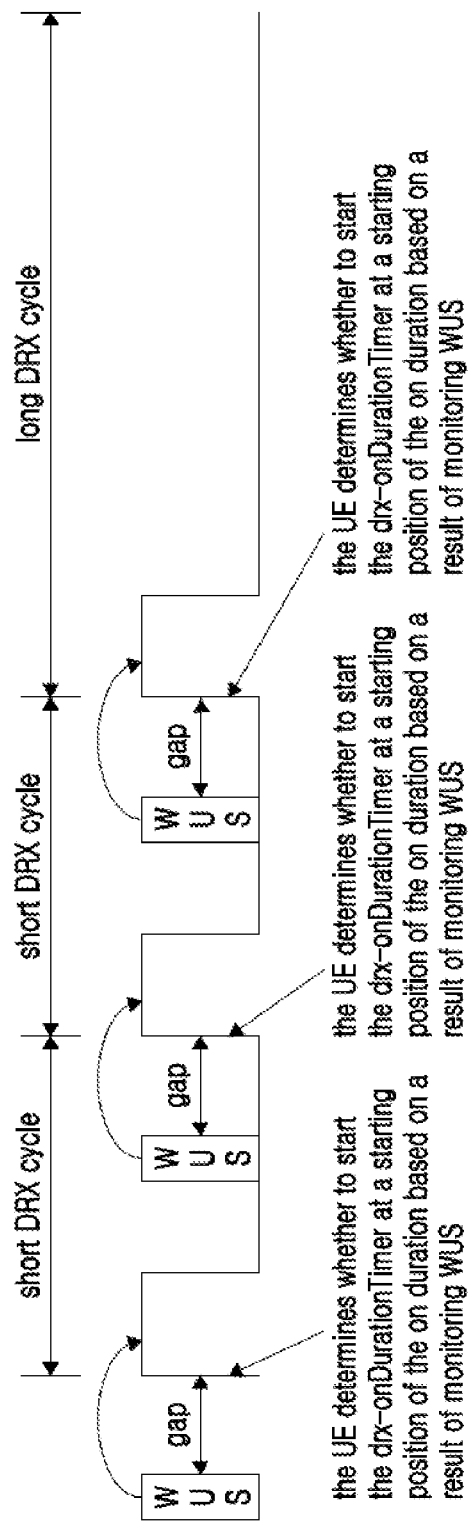
FIG. 6 is a schematic diagram of another WUS that can be used in an RRC connected mode according to an embodiment of the disclosure.

In particular, FIG. 6 shows a schematic diagram of the WUS in the RRC connected mode. In FIG. 6, the UE is configured with a short DRX cycle. When the UE applies the short DRX cycle, the On-Duration of two consecutive short DRX cycles corresponds to one WUS, that is, the WUS and the On-Duration of the short DRX cycle is an one-to-multiple correspondence. When the UE applies the long DRX cycle, the On-Duration of a long DRX cycle corresponds to one WUS, that is, the WUS and the On-Duration of the long DRX cycle is an one-to-one correspondence.

In one example, the system specifies that when the WUS and the On-Duration are configured as an one-to-multiple correspondence and the short DRX cycle is configured, the one-to-multiple correspondence is only applied to the On-Duration of the short DRX cycle, the On-Duration of the long DRX cycle and the WUS default use an one-to-one correspondence.

In an example, the system specifies that when the WUS and the On-Duration are configured as an one-to-multiple correspondence and the short DRX cycle is configured, the one-to-multiple correspondence can be applied to both the short DRX cycle and the long DRX cycle, that is, regardless of whether the UE applies a long DRX cycle or a short DRX cycle, one WUS corresponds to N On-Durations, and N is a configurable value.

In an example, the system specifies that when the short DRX cycle is configured, the correspondence between the WUS and the On-Duration can be configured separately for the short DRX cycle and the long DRX cycle. For example, when the UE applies the short DRX cycle, one WUS can be configured to correspond M On-Durations, when the UE applies a long DRX cycle, one WUS can be configured to correspond to N On-Durations, and N and M can be configured separately.

In one example, the system specifies that when the short DRX cycle is configured, one WUS can be configured to correspond to the On-Duration of N short DRX cycles, wherein N is a configurable value, and the system specifies that the maximum value of N is the drx-ShortCycleTimer, and Optionally, the configurable value of N must be divisible by the drx-ShortCycleTimer.

In one example, the system specifies that when a short DRX cycle is configured, one WUS can be configured to correspond to the On-Duration of N short DRX cycles, and the system specifies that N is fixed as the drx-ShortCycleTimer.

In one example, the system specifies that the WUS can only be used for the DRX cycle values greater than a certain threshold. For small cycle values of DRX, it does not need to configure the WUS. In one example, the system specifies that the WUS can only be used for the DRX cycle values less than a certain threshold. For the DRX with large cycle values, it does not need to configure the WUS.

Figure 7:
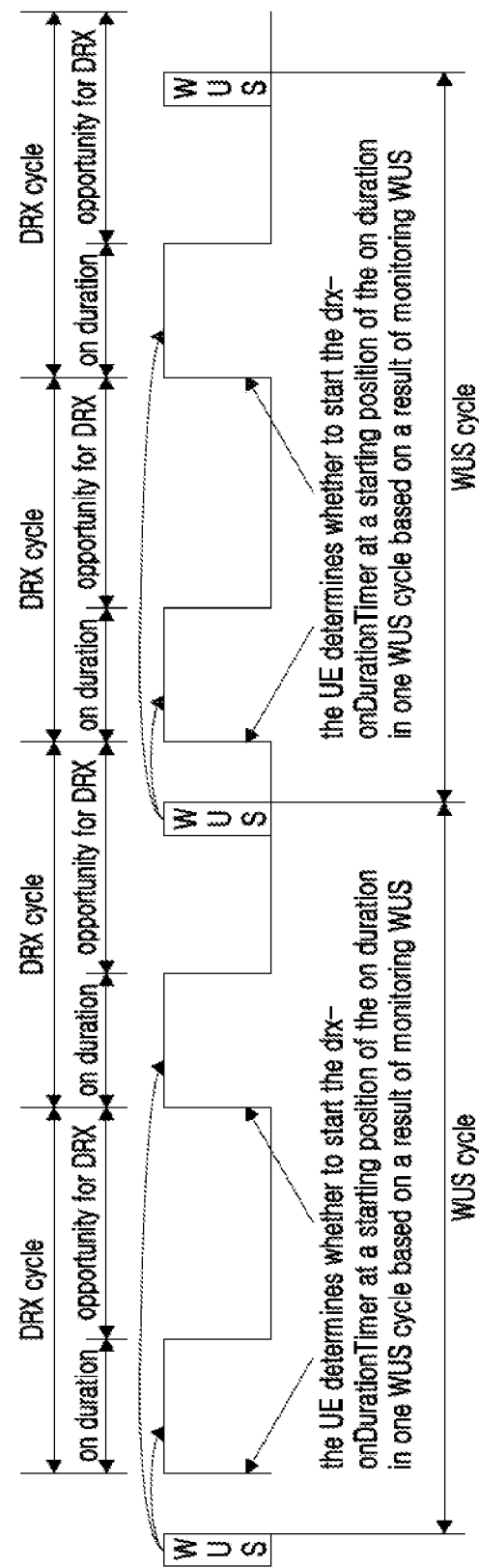
FIG. 7 is a schematic diagram of another WUS that can be used in an RRC connected mode according to an embodiment of the disclosure.

Further, FIG. 7 shows a schematic diagram of the WUS in the RRC connected mode, wherein the periodic WUS has no fixed association relationship with the position of the On-Duration. In FIG. 6, the WUS and the On-Duration are not necessarily related in the time domain. The UE periodically monitors the WUS. The WUS cycle is configurable. The WUS cycle should be equal to or greater than the DRX cycle. If the UE monitors the WUS, the UE should start the drx-onDurationTimer and starts monitoring the PDCCH at the starting position of all On-Durations in the next WUS cycle. Otherwise, the UE does not need to start the drx-onDurationTimer and start monitoring the PDCCH at the starting position of these On-Durations, the time domain position of the WUS can be configured by the offset value within the cycle.

In a preferred embodiment of the present disclosure, when the UE is still in the DRX active mode at the time of receiving the physical layer power saving signal, the UE does not monitor the physical layer power saving signal.

Specifically, under a certain special condition, it is not necessary to monitor the WUS. The On-Duration of the DRX cycle can be extended by data scheduling (uplink or downlink). The UE starts or reboots the drx-InactivityTimer as long as it receives the new data schedule. The On-Duration can be extended by the drx-InactivityTimer continuously, if the UE has many data services, and the On-Duration may be extended to the entire DRX cycle. In some cases, one DRX cycle may always be the On-Durations without the Opportunity-for-DRX, then the UE may still be in the On-Duration at the WUS time position. That is, the drx-InactivityTimer is still running, and the system should make special provisions for the UE behavior at this time.

Optionally, in the time position of the WUS, if the drx-InactivityTimer of the UE is still running, the UE does not need to monitor the WUS, and does not start the drx-onDurationTimer by default at the starting position of the corresponding On-Duration. In this case, the base station does not need to transmit the WUS. In other words, the UE only monitors the WUS during the Opportunity-for-DRX, and does not need to monitor the WUS during the On-Duration for the DRX.

Optionally, in the time position of the WUS, if the drx-InactivityTimer of the UE is still running, the UE does not need to monitor the WUS, and starts the drx-onDurationTimer by default at the starting position of the corresponding On-Duration. In this case, the base station does not need to transmit the WUS. In other words, the UE only monitors the WUS during Opportunity-for-DRX, and does not need to monitor the WUS during the On-Duration for the DRX.

Optionally, in the time position of the WUS, if the drx-InactivityTimer of the UE is still running, the UE still needs to monitor the WUS. If the UE has monitored the WUS, the UE starts the drx-onDurationTimer at the starting position of the corresponding On-Duration, if the UE does not monitor the WUS, there is no need to start the drx-onDurationTimer at the starting position of the corresponding On-Duration. In other words, the UE should monitor the WUS regardless of whether the UE is in the On-Duration for the DRX or the Opportunity-for-DRX, and determine whether to start the drx-onDurationTimer at the starting position of the On-Duration according to whether the WUS is monitored. In fact, even if the UE has not monitored the WUS, it is still possible to monitor the PDCCH in the corresponding On-Duration, because the drx-InactivityTimer performed by the last DRX cycle may still be running.

In a preferred embodiment of the present disclosure, when the UE is in the RRC connected mode and is configured with the DRX, starting or stopping a monitoring of the PDCCH based on the monitoring result of the physical layer power saving signal includes:

stopping the drx-onDurationTimer and/or drx-InactivityTimer.

Specifically, in an alternative solution, the UE being in the RRC connected mode is configured with DRX, and when the UE has already entered the On-Duration for the DRX, that is, when the drx-onDurationTimer and/or the drx-InactivityTimer are running, if the base station will not schedule the UE, the base station may transmit a physical layer signal to indicate the UE to stop monitoring the PDCCH, that is, to enter the Opportunity-for-DRX in advance, and if the base station will schedule the UE again, the base station will not transmit the sleep signal (Go To Sleep Signal, GTSS), the GTSS for indicating that the DRX UE in the RRC connected mode stops monitoring the PDCCH can quickly indicate the UE to enter the Opportunity-for-DRX, and further reduce the UE power consumption, compared to the existing DRX Command MAC CE.

If the UE is configured with the above GTSS that is used to indicate the UE being in the RRC connected mode to stop monitoring the PDCCH, the UE will monitor the GTSS during each On-Duration for the DRX, and if the UE has monitored the GTSS, the UE behavior is similar to the behavior after the UE receives the DRX Command MAC CE in the existing system, the UE should stop the drx-onDurationTimer and/or the drx-InactivityTimer, that is, stop monitoring the PDCCH and enter the Opportunity-for-DRX. If the drx-RetransmissionTimer is still running, the UE still needs to continue monitoring the PDCCH for scheduling retransmission until the dre-Retransmission-Timer expires, the monitoring of the PDCCH is completely stopped. If the UE has not monitored the GTSS, the UE will continue monitoring the PDCCH until the drx-onDuration-Timer and/or drx-InactivityTimer expires and then enter the Opportunity-for-DRX.

Figure 8:
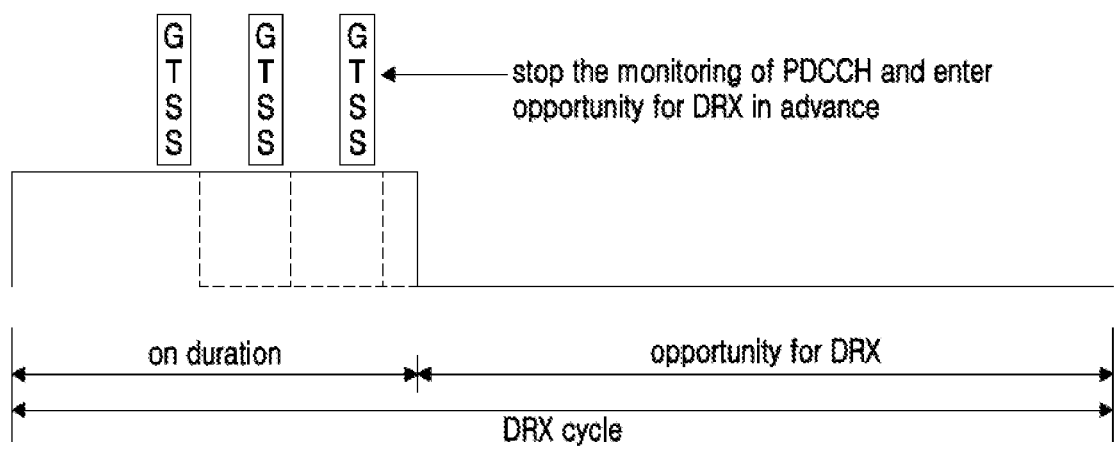
FIG. 8 is a schematic diagram of a GTSS that can be used to indicate a DRX UE being in an RRC connected mode to stop monitoring a PDCCH according to an embodiment of the disclosure.

FIG. 8 is a schematic diagram of the above GTSS that is used to indicate a DRX UE being in an RRC connected mode to stop monitoring the PDCCH. In FIG. 8, the UE periodically monitors the GTSS during the On-Duration for the DRX, and determines whether to enter the Opportunity-for-DRX in advance based on the monitoring result of the GTSS.

Optionally, if the UE is configured with a short DRX cycle, the GTSS may also indicate the UE whether to enter the short DRX cycle or the long DRX cycle after stopping monitoring the PDCCH. For example, the GTSS is composed of two sequences, one of which is used to indicate the UE to enter a short DRX cycle after stopping monitoring the PDCCH, which similar to the existing DRX Command MAC CE, and another sequence is used to indicate the UE to enter the long DRX cycle after stopping monitoring the PDCCH, which is similar to the existing Long DRX Command MAC CE. The two sequences can be multiplexed on the same time-frequency resource by CDM.

In a preferred embodiment of the present disclosure, the UE monitors the physical layer power saving signal, and it includes that:

the UE monitors the physical layer power saving signal based on a search space of the PDCCH.

Figure 9:
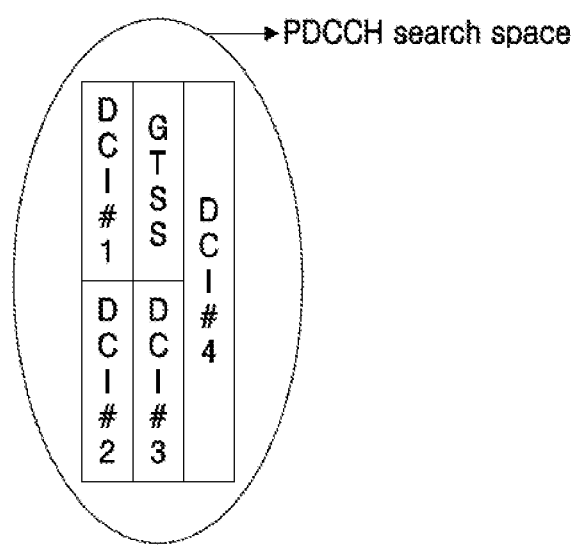
FIG. 9 is a schematic diagram of scheduling GTSS based on a search space of a PDCCH according to an embodiment of the disclosure.

FIG. 9 shows a schematic diagram of scheduling GTSS based on a search space of the PDCCH. In FIG. 9, the GTSS is designed based on the sequence, and the base station uses the same scheduling mechanism as the DCI for the physical resource allocation of the GTSS, that is, the UE blindly detects the GTSS based on the search space of the PDCCH. The advantage of this design is that the base station does not need to specifically configure the physical resources of the GTSS. Like the DCI, the GTSS may or may not be transmitted. The GTSS may share the Control Resource Set (CORESET) like the DCI. The base station may select one of PDCCH-search-space-based candidate resources according to the actual scheduling conditions to improve the effectiveness of resource scheduling.

For example, the system specifies or configures the GTSS to occupy the same physical resource size as the DCI with an Aggregation Level (AL) of 1, that is, the GTSS occupies one control channel element (CCE) which consists of six resource element group (REG) consisting of one resource block (RB) on one symbol. The number of the candidate resources specified or configured by the system for GTSS is 4, then the UE will detect the GTSS at these 4 candidate positions.

Essentially, the GTSS herein uses the resource scheduling manner for DCI to allocate the physical resources, but the GTSS designed based on sequence is transmitted within the physical resources instead of DCI. This design method can also be applied to other physical layer power saving signals, such as WUS for C-DRX, WUS for paging, and PDCCH SS for non-C-DRX.

In a preferred embodiment of the present disclosure, when the UE is in the RRC idle mode or an in-active mode, starting or stopping a monitoring of the PDCCH based on the physical layer power signal includes: when the physical layer power saving signal is monitored, monitoring the paging occasion (PO) corresponding to the physical layer power saving signal.

In an alternative, the UE being in RRC idle mode or inactive mode does not always have a paging message at each PO. If the base station will transmit a paging channel at a PO, the base station can transmit a physical layer signal before the PO to wake up the UE to monitor the PDCCH at the PO. If the base station will not transmit the paging channel at a PO, the base station will not transmit the WUS, which is used to wake up the UE being in the RRC idle mode or the inactive mode to monitor the WUS of the PDCCH at the PO, and can further reduce the UE power consumption based on the DRX in the RRC idle mode or the in-active mode.

If the UE is configured to wake up the UE being in the RRC idle mode or the in-active mode to monitor the WUS of the PDCCH at the PO, then the UE will monitor the corresponding WUS before the PO. If the UE has monitored the WUS, the PDCCH is monitored at the corresponding PO. If the UE has not monitored the WUS, it is not necessary to monitor the PDCCH at the corresponding PO.

Optionally, one WUS may correspond to one PO, i.e., similar to the WUS for C-DRX described above in FIG. 2. Optionally, one WUS may correspond to multiple consecutive POs, and the number of corresponding consecutive POs is configurable, i.e., similar to the above-described WUS for C-DRX in FIG. 3. Optionally, if the WUS is not monitored, one WUS may correspond to one PO. If the WUS is monitored, one WUS may correspond to multiple consecutive POs, that is, similar to the above FIG. 4 for C-DRX.

Figure 10:
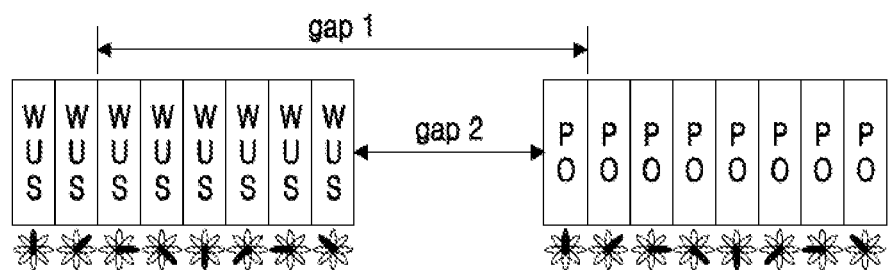
FIG. 10 is a schematic diagram of a WUS that can be used to wake up the UE being in an RRC idle mode or an in-active mode to monitor a PDCCH in a PO according to an embodiment of the disclosure.

FIG. 10 is a schematic diagram of the above-mentioned WUS for waking up the UE being in the RRC idle mode or the in-active mode to monitor the PDCCH at the PO. In FIG. 10, the usage scenario is a high frequency carrier. For example, if the carrier frequency is 30 GHz and the PO needs to be transmitted by beam sweeping, the corresponding WUS will use the same beam sweeping manner, that is, use the same number of beams and beam sweeping order. As shown in the figure, the PO and its corresponding WUS are sequentially transmitted in eight beam directions. In the 5G NR system, PO and SSB (SS/PBCH) use the same number of beams and beam sweeping order, therefore, the WUS and SSB also use the same number of beams and the beam sweeping order.

Figure 11:
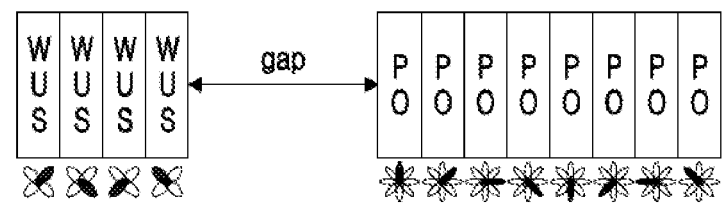
FIG. 11 is a schematic diagram of another WUS that can be used to wake up the UE being in an RRC idle mode or an in-active mode to monitor a PDCCH in a PO according to an embodiment of the disclosure.

Optionally, the transmission beam of the WUS may be smaller than the transmission beam of the PO. For example, as shown in FIG. 11, the PO is transmitted based on 8 beams, that is, the base station transmits the PO through a narrow beam, but the WUS is transmitted based on four beams, that is, the base station transmits the WUS through a wide beam for saving the overall resource overhead of WUS.

In practical applications, if the UE being in the RRC idle mode or the in-active mode does not perform downlink transmission beam training, that is, the information of the best downlink transmission beam is not acquired, the UE should monitor the WUSs in all beam directions, if the WUSs in all the beam direction are not monitored, the UE considers that there is no corresponding PO and returns to the sleep mode. If the UE being in the RRC idle mode or the in-active mode has performed downlink transmission beam training, for example, the system-based SS/PBCH block (Synchronization Signal, SS) performs the beam training and acquires information of the best downlink transmission beam, the UE can only monitor the WUS in the best beam direction. If the WUS in the best beam direction is not monitored, the UE can consider that there is no corresponding PO and return to the sleep mode.

In an example, there is a time gap between the WUS and the PO, which is used to reserve the preparation time for the UE to monitor the PO, for example, the time-frequency synchronization of the wireless channel, the Warm Up of the internal circuit module, and the like. The time gap between the WUS and the PO is configurable. The minimum time gap that the UE can support is related to the UE capability. For example, the system specifies two UE capabilities, one is a short gap and the other is a long gap. The UE should report its relevant capability to the base station, that is, report the minimum time gap between the WUS and PO that the UE can support. The base station should consider the capability reported by the UE when configuring the time gap between the WUS and the PO.

Optionally, the time gap between the WUS and the PO is defined as the time gap between the WUS and the PO in the same beam direction, that is, the gap 1 in FIG. 10.

Optionally, the time gap between the WUS and the PO is defined as a time gap between the ending position of the WUS beam and the starting position of the PO beam, that is, the gap 2 in FIG. 10.

In one example, the WUS for the PO may also be grouped based on the UE, and is composed of multiple groups of the WUSs, that is, multiple groups of the WUSs correspond to the same PO, and each group of the WUSs is used to wake up a group of UEs corresponding to the PO. The UE corresponding to the PO are grouped according to a pre-defined grouping method. For example, for the groups of UEs based ID, each group of UEs monitors the group of WUSs to which they belong. If the base station pages a certain UE in the PO, the group of UEs to which the UE belongs is transmitted and other groups of WUSs do not need to be transmitted. The UE-based group of WUSs can effectively reduce the probability that the UE wakes up to monitor paging messages that are not its own, which further reduce the UE power consumption.

Optionally, the base station configures the number of groups of WUSs via system information, that is, the number of groups of WUSs is configurable.

Optionally, the foregoing group of WUSs is multiplexed by the CDM, and the base station can only transmit one WUS at a time on the CDM-based WUS time-frequency resource, and the WUS can be used to wake up any one or more groups of UEs corresponding to the PO, the CDM is also called as Single-Sequence CDM.

Optionally, the above-mentioned group of WUSs is multiplexed by FDM, and the group of WUSs is completely continuous in the frequency domain.

Optionally, the above-mentioned group of WUSs is multiplexed by TDM, and the group of WUSs is completely continuous in the time domain.

Optionally, the foregoing group of WUSs is multiplexed by TDM, and the group of WUSs is discontinuous in the time domain, that is, the time gap between the group of WUSs and the corresponding PO is different, and the time gap between the group of WUSs and the corresponding PO corresponds to different UE capabilities, that is, correspond to that the UEs of the same PO are grouped through the UE capability of the time gap between the WUS and the PO.

Optionally, the foregoing group of WUSs may be multiplexed by any combination of single-sequence CDM, FDM, and TDM, and the specific multiplexing manner depends on the configuration of the base station.

Optionally, when the system applies the above-mentioned group of WUSs, the system specifies to group the UEs based on the gap between WUS and PO, the different UEs have the capability supporting different gaps and report the capability to the base station. For example, the system divides the UEs corresponding to the same PO into two groups, one of which has a short gap capability, that is, it can switch from the sleep mode to the PO monitoring mode in a short time, and another group of UEs has a long gap capability, that is, it may require a long time to switch from the sleep mode to the PO monitoring mode.

Optionally, when the system applies the above-mentioned group of WUSs, the system specifies that the UEs are grouped based on the UE ID, that is, the ID of the group of WUSs is calculated by the UE ID, for example, Group_ID=UE_ID % Num_Group_WUS, where Num_Group_WUS is the number of group of WUSs, and UE_ID is calculated through the IMSI of the UE, for example, UE_ID=IMSI %16384.

Optionally, when the system applies the foregoing group of WUSs, the system specifies that the UEs are grouped based on different area of Reference Signal Receiving Power (RSRP) or Reference Signal Receiving Quality (RSRQ), for example, the UEs in different RSRP areas correspond to different groups of WUSs, the UE in a same RSRP area monitors a same group of WUSs. Herein, the UE should measure the RSRP periodically, when the area of the measured RSRP is changed, it is necessary to report the RSRP and its area in time to the network.

Optionally, when the system applies the group of WUSs described above, the system specifies that the UEs are grouped based on different transmission beams or different transmission beam sets. For example, the system uses 12 beams to transmit downlink, wherein each 4 transmission beams correspond to one group of WUSs, that is, the base station transmits three group of WUSs, and each group of WUSs is transmitted based on the corresponding four beams. The advantage of this design is that the group of WUSs does not introduce any additional resource overhead compared to the non-grouped WUSs, but requires that the best transmission beam for the downlink of the UE is statically changed, for example, the position of the UE and diffusers around the UE are almost static. Herein, the UE should report the best transmission beam of the downlink or its set to the network.

Optionally, when the system applies the above-mentioned group of WUSs, the system notifies the index of the group of WUSs monitored by each UE.

Optionally, in addition to monitoring the above-mentioned group of WUSs, the UE also monitors a common WUS, which is used to wake up all UEs corresponding to the PO. The UE first monitors the group of WUSs to which the UE belongs. If the UE has monitored the group of WUSs, the UE has monitored the corresponding PO. If the UE has not monitored the group of WUSs, it monitors the common WUS. If the UE has monitored the common WUS, it monitors the corresponding PO. If the UE has not monitored the common WUS, it returns to the sleep mode.

In a preferred embodiment of the disclosure, when the UE is in the RRC connected mode, the method further includes:
  receiving a PDCCH or a physical downlink shared channel (PDSCH);
  when a physical resource block (PRB) occupied by the PDCCH or the PDSCH overlaps with the PRB occupied by the physical layer power saving signal corresponding to the UE in the RRC idle mode or the in-active mode, discarding a receiving signal on the overlapped PRB.

In one example, the above WUS for paging is implemented based on the RS. For example, the WUS can refer to the existing CSI-RS or TRS design in the 5G NR system, and the resource element (RE) carrying the WUS in the time domain and frequency domain are not continuous. The RBs used for WUS transmission may also be used for scheduling of other physical channels, for example, for the PDCCH or the PDSCH. If the RB of the PDCCH/PDSCH overlaps with the RB used for WUS transmission, the UE should discard the received signal on the WUS RE when receiving the PDCCH/PDSCH.

If the RB of the PDSCH overlaps with the RB of the WUS, the base station has two processing manners when transmitting the PDSCH, and one processing manner is rate matching, that is, the total number of REs matching the rate of the encoded data stream for PDSCH does not contain the WUS RE, and the base station maps the encoded data stream of the PDSCH to the non-WUS RE; the other processing manner is puncturing, that is, the total number of REs matching the rate of the encoded data stream for PDSCH contains the WUS RE, and the base station punctures the encoded data stream of the PDSCH at the WUS RE position, that is, the corresponding data symbol is discarded and not transmitted. Correspondingly, the UE may also perform different decoding processes on the PDSCH based on the assumption of rate matching or puncturing.

In order to apply the RB for the WUS transmission to the PDCCH or the PDSCH, all the UEs in the cell, including the UE being in the RRC connected mode and the RRC idle mode or the in-active mode, should receive the configuration information of the WUS for paging to determine whether the received PDCCH/PDSCH has a resource overlapping with the WUS for paging. If there is an overlapped resource, the UE should decode the PDCCH/PDSCH based on a predefined assumption, and the predefined assumption is rate matching or puncturing.

Optionally, if a PDSCH has a resource overlapping with a WUS for paging, the PDCCH scheduling the PDSCH indicates to the UE whether it is necessary to discard the received signal on the WUS RE when decoding the PDSCH. For example, "0" indicates that the WUS has no actual transmission and the UE should use the received signal on the WUS RE for decoding the PDSCH. The "1" indicates that the WUS has the actual transmission and the UE should discard the received signal on the WUS RE for decoding the PDSCH, and decode the PDSCH based on the assumption of rate matching or puncturing.

Optionally, if one PDCCH/PDSCH has a resource overlapping with the WUS for paging, regardless of whether the WUS has the actual transmission, the UE always discards the received signal on the WUS RE for decoding the PDCCH/PDSCH, and decode the PDCCH/PDSCH based on the assumption of rate matching or puncturing.

Optionally, if one PDCCH/PDSCH has a resource overlapping with the WUS for paging, the UE receiving the PDCCH/PDSCH should monitor the WUS to determine whether the WUS has the actual transmission. If the WUS has no actual transmission, the UE should decode the PDCCH/PDSCH by using the received signal on the WUS RE, if the WUS has the actual transmission, the UE should discard the received signal on the WUS RE for decoding the PDCCH/PDSCH, and decode the PDCCH/PDSCH based on the assumption of rate matching or puncturing.

Optionally, the method for performing the rate matching or puncturing on the WSCH RE by the PDSCH is also applicable to the WUS designed based on the sequence, that is, although the WUS RE is continuous in the frequency domain, the overall occupied time-frequency domain RB is relatively small, in order to avoid the resource fragmentation, the RBs allocated to the PDSCH may contain WUS RBs.

In a preferred embodiment of the present disclosure, the UE measures the RSRP or RSRQ based on a physical layer power saving signal corresponding to the PO.

In an example, the foregoing WUS for Paging can be used to assist the UE being in the RRC idle mode or the in-active mode to perform RRM measurement. In the 5G NR system, the UE being in the RRC idle mode or the in-active mode performs the RRM measurement based on the SSB (SS/PBCH block), the UE can combine WUS-based measurement results and SSB-based measurement results to improve the measurement accuracy or reduce the measurement time to reduce the UE power consumption. The prerequisite for the UE to assist the RRM measurement based on the WUS is that the WUS and the SSB must satisfy Quasi Co-Located (QCL). For the high-frequency carrier scenario, the WUS and the SSB in the same direction must satisfy the QCL. In addition, the UE also needs to know the difference between the transmit power of the WUS and the SSB.

Optionally, the base station configures that the WUS and the SSB satisfy the QCL. Optionally, the system specifies that WUS and the SSB satisfy the QCL.

Optionally, the base station configures an offset value (Power Offset) of the transmit power of the WUS and the SSB. If the offset value is not configured, the default offset value of the transmit power of the WUS and the SSB is 0 dB. Optionally, the system specifies that the power offset value of the WUS and the SSB is 0 dB.

In a preferred embodiment of the present disclosure, when the UE is in the RRC connected mode and is not configured with the DRX, starting or stopping monitoring the physical layer power saving signal based on the monitoring result of the physical layer power saving signal includes:
  performing or skipping the monitoring of the PDCCH within a time window corresponding to the physical layer power saving signal.

In an alternative, the UE being in the RRC connected mode is not configured with the DRX, but the base station does not always schedule the UE. When the base station will not schedule the UE within a period of time, the base station may transmit the PDCCH skipping signal (PDCCH SS) to indicate the UE to skip the monitoring of the PDCCH within a preconfigured time window, thereby to effectively reduce the UE power consumption.

Figure 12:
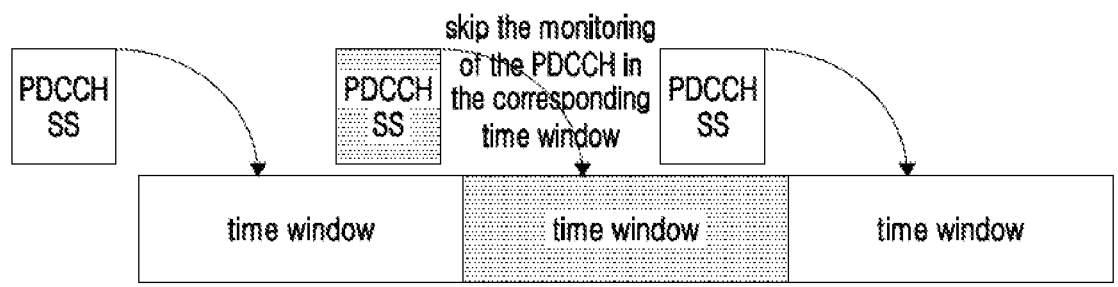
FIG. 12 is a schematic diagram of a PDCCH SS that can be used to indicate the UE being in an RRC connected mode to skip the monitoring of the PDCCH according to an Embodiment of the disclosure.

FIG. 12 is a schematic diagram of the above-described PDCCH SS for indicating the UE being in the RRC connected mode to skip the monitoring of the PDCCH. In FIG. 12, the UE periodically monitors the PDCCH SS, and each PDCCH SS corresponds to a preconfigured time window. If the UE has monitored the PDCCH SS; if the UE has already monitored the PDCCH, the monitoring of the PDCCH is skipped in the corresponding time window, that is, stop monitoring the PDCCH; if the UE has not monitored the PDCCH SS, the PDCCH is continuously monitored in the corresponding time window.

Preferably, when the UE is indicated to skip the monitoring of the PDCCH within one time window, the UE behavior is the same as the UE behavior of the existing Opportunity-for-DRX, and the allowable UE behavior within the time window is: DL HARQ feedback, aperiodic SRS transmission, non-dynamically scheduled preconfigured uplink transmission (including Type I and Type II), various UE measurements, for example, measurement for Radio Resource Management (RRM), measurement for radio link monitoring (RLM) and measurement for beam failure recovery (BFR). The UE behavior that should be prohibited within the time window are: PDCCH monitoring, periodic SRS transmission, semi-persistent SRS transmission, periodic CSI reporting based on PUCCH, and semi-static CSI reporting based on PUSCH.

Optionally, the UE only skips the monitoring of the PDCCH within the time window corresponding to the PDCCH SS, and other preconfigured UE behaviors are not affected, for example, the behaviors such as periodic SRS transmission, semi-static SRS transmission, periodic CSI reporting based on PUCCH, and semi-static CSI reporting based on PUSCH are not affected.

Optionally, the time window is based on absolute time. For example, the length of the time window is N ms, and N may be fixed by the system or a configurable value of the system.

Optionally, the time window is measured by the number of PDCCH cycles. For example, the length of the time window is N PDCCH cycles, and N may be fixed by the system or a configurable value of the system.

Optionally, the time window is measured by the number of PDCCH occasions, for example, the length of the time window is N PDCCH occasions, and N may be fixed by the system or a configurable value of the system.

In an example, more specifically, the time window corresponding to each PDCCH SS is completely continuous, that is, the entire time axis completely corresponds to the periodic PDCCH SS, and the length of the time window corresponding to the PDCCH SS is defaulted to be equal to the cycle of the PDCCH SS.

The UE should monitor the PDCCH SS of each cycle, whether or not it is in the Opportunity-for-DRX. For example, when the PDCCH SS is contained in the time window corresponding to the previous PDCCH SS, and the UE skips the monitoring of the PDCCH within this time window, the UE should also wake up to monitor the PDCCH SS and determine whether to monitor the PDCCH in the corresponding time window according to whether the PDCCH SS is monitored.

In an example, more specifically, the time window corresponding to each PDCCH SS may be discontinuous, that is, only part of the entire time axis corresponds to the periodic PDCCH SS, and the length of the time window corresponding to the PDCCH SS is smaller than the cycle of the PDCCH SS, and it is necessary to be specially configured, on the time axis beyond the time window corresponding to the PDCCH SS, that the UE should monitor the PDCCH by default.

In an example, more specifically, the UE stops monitoring the PDCCH at a time point after the PDCCH SS is monitored, and continues for a length of a preconfigured time window, for example, the time point is the $N^{th}$ slot or the $N^{th}$ symbol after the PDCCH SS is monitored, wherein N is a fixed value of the system, or a configurable value of the system.

According to the meaning of the indication of the physical layer power saving signal, the PDCCH SS may also be referred to as a PDCCH monitoring signal (PDCCH MS), and the UE is configured with a periodic PDCCH MS, and each PDCCH MS corresponds to a preconfigured time window, if the UE has monitored the PDCCH MS, then continues monitoring the PDCCH in the corresponding time window. If the UE has not monitored the PDCCH MS, it is not necessary to monitor the PDCCH in the corresponding time window.

Further, the foregoing physical layer power saving signal, including WUS for C-DRX, GTSS for C-DRX, and PDCCH SS for non-C-DRX, performs the UE to start or stop the monitoring of the PDCCH to achieve the purpose of power saving is because the monitoring of the PDCCH is actually a major power consumption behavior.

In a 5G NR system, the UE may be configured with multiple CORESETs and multiple PDCCH search spaces in one Bandwidth Part (BWP), and the CORESET is used to configure time-frequency resources of the PDCCH, and each PDCCH search space corresponds to one CORESET. The PDCCH search space is used to configure a monitoring cycle, an aggregation level, and a number of times of blind detections of the PDCCH. In order to more accurately control the UE power saving behavior, the system may use a corresponding physical layer power saving signal for each PDCCH search space.

In a preferred embodiment of the present disclosure, the physical layer power saving signal has a corresponding PDCCH search space, and starting or stopping a monitoring of the PDCCH based on a result of the monitoring of the physical layer power saving signal includes:

starting or stopping the monitoring of the PDCCH of the search space corresponding to the physical layer power saving signal.

Figure 13:
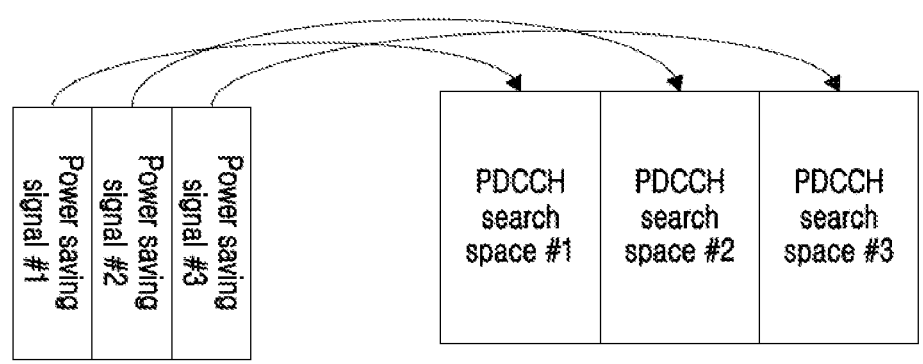
FIG. 13 is a schematic diagram of the control signaling corresponding to a search space of a PDCCH according to an embodiment of the disclosure.

FIG. 13 is a schematic diagram showing that a physical layer power saving signal corresponds to a PDCCH search space. In FIG. 13, the UE is configured with three PDCCH search spaces. When the UE is configured with the physical layer power saving signal, the number of physical layer power saving signals is the same as the number of configured PDCCH search spaces, and each physical layer power saving is used to perform the UE to start or stop monitoring the PDCCH on the corresponding PDCCH search space.

In FIG. 13, the multiplexing manner between the physical layer power saving signals corresponding to different PDCCH search spaces may be TDM, FDM, and/or CDM, and the above multiplexing manner between the multiple groups of WUSs for the PO may also be applied here.

In a preferred embodiment of the present disclosure, the physical layer power saving signal is carried by a dedicated signal sequence or a reference signal sequence, and monitoring, by the UE, the physical layer power saving signal includes monitoring, by the UE, the physical layer power saving signal based on configuration information of the physical layer power saving signal;

the configuration information of the physical layer power saving signal includes at least one of the following parameters:

time domain resource position of the physical layer power saving signal;

frequency domain resource position of the physical layer power saving signal;

carrier bandwidth part (BWP) of the physical layer power saving signal;

subcarrier spacing of the physical layer power saving signal;

transmission beam of the physical layer power saving signal.

The above physical layer power saving signal may be the WUS for C-DRX, the GTSS for C-DRX, the PDCCH SS for non-C-DRX, or the WUS for paging described above.

Further, the control signaling has a time domain position. Optionally, the WUS for the C-DRX determines the time domain position of the WUS by defining a time gap (gap) of the WUS and the On-Duration, and the gap is defined as the time gap between the ending position of the WUS and the starting position of the On-Duration. The gap can be predefined by the system or configured by the base station. The UE determines the ending position of the WUS in the time domain based on the gap and the starting position of the On-Duration, and then determines the starting position of the WUS in the time domain according to the duration of the WUS in the time domain.

The gap can be based on millisecond (ms) or the number of the slots. When the gap is based on millisecond, the gap can be accurate to $\frac{1}{32}$ ms to explicitly indicate the position of WUS within 1 ms, which is suitable for the case where the subcarrier spacing is greater than 15 kHz.

The duration of the WUS in the time domain may be fixed, for example, fixed to one OFDM symbol or one slot (containing 14 OFDM symbols), or may be configured by a base station, and the WUS duration is based on the number of the OFDM symbols of the number of slots.

Figure 14:
FIG. 14 is a schematic diagram of a time gap according to an embodiment of the disclosure.

In an example, as shown in FIG. 14, the gap is defined as the time gap between the ending position of the WUS and the starting position of the On-Duration, the base station explicitly indicates the duration of the actual transmission of the WUS in the time domain, or the system specifies the duration of the actual transmission of the WUS in the time domain.

Figure 15:
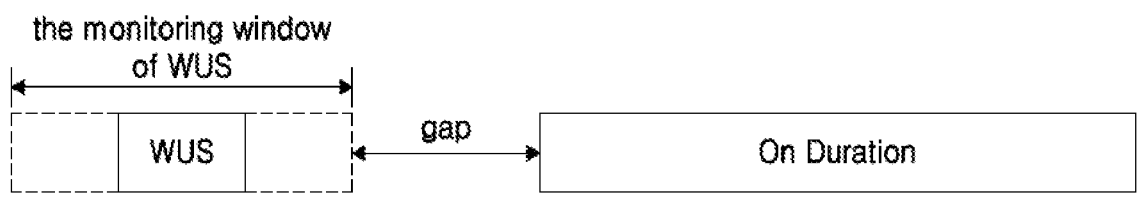
FIG. 15 is a schematic diagram of another time gap according to an embodiment of the disclosure.

In another example, as shown in FIG. 15, the above gap is defined as the time gap between the ending position of the monitoring window of the WUS and the starting position of the On-Duration. Herein, the base station configures a monitoring window of the WUS, and the UE blindly detects the actual position of the WUS within the monitoring window. The base station explicitly indicates the duration of the actual transmission of the WUS in the time domain, or the system specifies the duration of the actual transmission of the WUS in the time domain.

Figure 16:
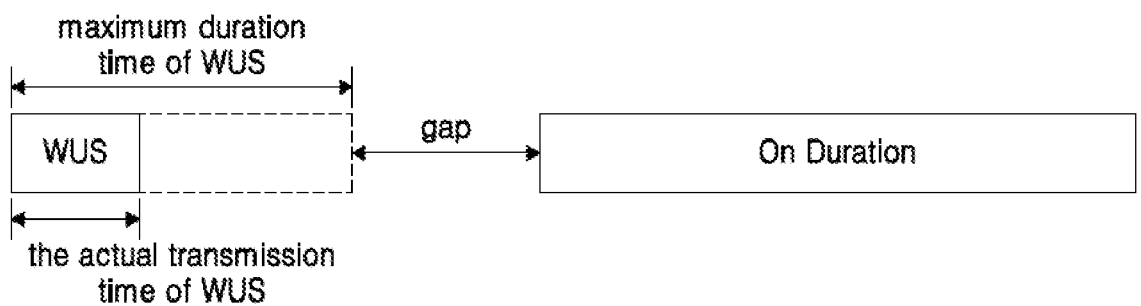
FIG. 16 is a schematic diagram of still another time gap according to an embodiment of the disclosure.

In another example, as shown in FIG. 16, the above gap is defined as the time gap between the ending position of the maximum duration in which the WUS is transmitted and the starting position of the On-Duration, wherein the base station does not indicate the duration of the actual transmission of the WUS in the time domain, and only indicate the maximum duration of the WUS in the time domain. The duration of the actual transmission of the WUS may be less than or equal to the configured maximum duration. In the actual transmission, the starting time of the WUS is fixed, that is, the starting time where the WUS is transmitted with the maximum duration, but the ending time is not fixed.

Optionally, in the actual transmission, the starting time of the WUS is not fixed, but the ending time of the WUS is fixed, that is, the ending time where the WUS is transmitted according to the maximum duration.

Optionally, the WUS for paging determines the time position of the WUS by defining a time gap between the WUS and the PO, and the description of the gap between the WUS for the C-DRX and the On-Duration is also applicable to the time gap between the WUS and the PO.

All UEs that monitor the same PO are classified into N groups, and each group of UEs respectively corresponds to different WUSs. The N groups of WUSs can be multiplexed by TDM. Optionally, the base station separately configures a time gap of different groups of WUSs and the PO, and the UE determines the time domain position of the WUS according to the gap configuration value of the group of WUSs to which they belong. Optionally, the N groups of WUSs are completely contiguous in the time domain, that is, there is no time gap, the base station configures a time gap between the group of WUSs which is closest to the PO and the PO, and the time domain position of the other WUS is determined by the time domain position of the group of WUSs and the maximum duration of the WUS. Optionally, the maximum duration of the N groups of WUSs is the same. Optionally, the maximum durations of the N groups of the WUSs are different and are separately configured.

Optionally, the GTSS for C-DRX is periodically configured, and the cycle of the GTSS should be less than the DRX cycle to ensure that the UE can monitor the GTSS at least once in each DRX cycle. In addition, the UE only needs to monitor during the On-Duration for the DRX. Similar to the existing periodic physical signal configuration, the base station can jointly indicate the cycle of the GTSS and the position of the GTSS within the cycle.

Optionally, the PDCCH SS for the non-C-DRX is a periodic configuration, and similar to the existing periodic physical signal configuration, the base station can jointly indicate the cycle of the PDCCH SS and the position of the GTSS in the cycle.

Optionally, different PDCCH search spaces correspond to different WUSs, and the multiple WUSs are multiplexed by TDM, and the relevant description of the time domain positions of the multiple groups of WUSs for the PO may also be applied thereto.

Further, the control signaling also has the BWP.

Optionally, the BWP of the WUS for the C-DRX is the same as the BWP of the PDCCH, that is, the DL active BWP of the UE.

Optionally, the BWP of the WUS for the C-DRX uses the same central carrier frequency as the BWP of the PDCCH use the same central carrier frequency, but uses smaller carrier bandwidth, the carrier bandwidth of the WUS BWP may be configured through RRC high layer signaling, or may be predefined by a system.

Optionally, the BWP of the WUS for C-DRX is configured by the RRC signaling, which may be different from the BWP of the PDCCH.

Optionally, the BWP of the WUS for C-DRX uses the downlink default BWP (DL default BWP) of the UE.

Optionally, the BWP of the WUS for C-DRX is a downlink initial BWP (DL initial BWP) configured by the UE.

Optionally, the BWP of the WUS for paging is the same as the BWP of the PO.

Optionally, the BWP of the WUS for paging uses the same central carrier frequency as the BWP of the PO, but uses a smaller carrier bandwidth, the carrier bandwidth of the WUS BWP can be configured through system broadcast information, or can be predefined by the system.

Optionally, the BWP of the GTSS for the C-DRX is the same as the BWP of the PDCCH, that is, the DL active BWP of the UE.

Optionally, the BWP of the PDCCH SS for the non-C-DRX is the same as the BWP of the PDCCH, that is, the DL active BWP of the UE.

The frequency domain position of the control signaling within the BWP is determined by the following manner.

For simple design, the physical layer power saving signal is continuous in the frequency domain. For the physical layer power saving signal based on the RS design, the continuity here means that the PRB where the RS RE is located is continuous, but the RS RE is not continuous in the PRB, and may be discrete.

In an example, the bandwidth of the physical layer power saving signal in the frequency domain is fixed to N PRBs. At this time, the base station needs to indicate the starting position of the physical layer power saving signal in the BWP, and N is a predefined value of the system, for example, N=1.

In another example, the bandwidth of the physical layer power saving signal in the frequency domain is fixed to occupy the entire BWP, that is, no signaling is required to indicate the position of the physical layer power saving signal within the BWP, and it is only necessary to indicate the BWP of the physical layer power saving signal.

In an example, the bandwidth of the physical layer power saving signal in the frequency domain is configurable, that is, the base station not only indicates the starting position of the physical layer power saving signal within the BWP but also indicates the bandwidth occupied by the physical layer power saving signal, that is, the number of PRBs.

Further, the control signaling also has a subcarrier spacing.

Optionally, the subcarrier spacing of the physical layer power saving signal is the same as the subcarrier spacing of the BWP, and no signaling configuration is required, that is, the subcarrier spacing of the physical layer power saving signal is determined by its BWP.

Optionally, the subcarrier spacing of the physical layer power saving signal is the same as the subcarrier spacing of the PDCCH monitored by the UE, and no signaling configuration is required, that is, the subcarrier spacing of the physical layer power saving signal is determined by the subcarrier spacing of the PDCCH monitored by the UE.

Optionally, the subcarrier spacing of the physical layer power saving signal is fixed by the system, may be different from the subcarrier spacing of the BWP where the BWP is located, or may be different from the subcarrier spacing of the PDCCH monitored by the UE.

Optionally, the subcarrier spacing of the physical layer power saving signal is system configurable, and configured by the dedicated signaling, the configured value may be different from the subcarrier spacing of the BWP where the BWP is located, and may also be related to the subcarrier spacing of the PDCCH monitored by the UE.

Further, the control signaling also has a transmission beam.

Optionally, the WUS for C-DRX, the GTSS for C-DRX, and the PDCCH SS for non-C-DRX use the same transmission beam as the PDCCH on the DL active BWP, i.e. transmission configuration indicator (TCI) carried by the MAC CE.

In a 5G NR system, on one BWP, the UE may be configured with multiple UE-specific CORESETs, and the TCI state of the PDCCH is separately configured for each CORESET, if the UE is configured with multiple UE-specifics CORESETs on the DL active BWP and the TCI state of the PDCCH configured by each CORESET is different, the UE may use the PDCCH TCI state corresponding to the CORESET with the smallest index by default, or may use the PDCCH TCI state corresponding to one of the CORESETs through the RRC signaling configuration.

Optionally, the WUS for C-DRX is transmitted based on the beam sweeping, and the TCI set for WUS beam sweeping is a TCI set of PDCCHs on the DL active BWP, that is, by a PDCCH TCI set configured for each CORESET by the RRC signaling.

In a 5G NR system, on one BWP, the UE may be configured with multiple UE-specific CORESETs, and the TCI set of the PDCCH is separately configured for each CORESET, if the UE is configured with multiple UE-specific CORESETs on the DL active BWP and the TCI set of the PDCCH configured by each CORESET is different, the UE may use the PDCCH TCI set corresponding to the CORESET with the smallest index by default, or may use the PDCCH TCI set corresponding to one of the CORESETs through the RRC signaling configuration. It is also possible to use the union of the PDCCH TCI sets corresponding to all the UE-specific CORESETs.

Optionally, the WUS for C-DRX is transmitted based on the beam sweeping, and the TCI set for WUS beam sweeping is specifically configured by the RRC signaling.

Optionally, the WUS for paging uses the same beam sweeping transmission manner as the PO, that is, uses the same number of beams and the transmission order. In other words, the WUS for paging uses the same beam sweeping transmission manner as the SSB.

Optionally, the UE being in the RRC idle mode or the in-active mode acquires configuration information of the physical layer power saving signal by using system broadcast information, for example, the physical layer power saving signal is the WUS for paging.

Optionally, the UE being in the RRC connected mode acquires configuration information of the physical layer power saving signal by using the UE-specific RRC signaling, for example, the physical layer power saving signal is the WUS for C-DRX or the GTSS, or is the PDCCH SS for non-C-DRX.

Optionally, the UE being in the RRC connected mode acquires a set of configuration information of the physical layer power saving signal by using the UE-specific RRC signaling, and then starts one set of configuration information by using the MAC layer signaling.

In a preferred embodiment of the present disclosure, the physical layer power saving signal is carried by the DCI;

the DCI that carries the physical layer power saving signal is further used to schedule a physical uplink shared channel (PUSCH) or a physical downlink shared channel (PDSCH) of the UE.

Specifically, the UE is configured with a UE-specific DCI format containing a power saving signaling field by using the high layer signaling, and then the UE monitors the UE-specific DCI containing the power saving signaling field, after the UE monitors the UE-specific DCI, the UE decodes the indication value of the power saving signaling field contained in the UE-specific DCI, and performs a corresponding power saving operation at a predefined time after receiving the DCI, for example, stops the monitoring of the PDCCH and enters the Opportunity-for-DRX, or skips the monitoring of the PDCCH within a preconfigured time window.

Optionally, the UE monitors the DCI containing the power saving signaling field based on the C-RNTI. Optionally, the UE monitors the DCI containing the power saving signaling field based on a new defined RNTI type, for example, a defined PS-RNTI (Power Saving), and the value of the PS-RNTI may be specifically configured by the UE-specific RRC signaling.

Further, the DCI carrying the physical layer power saving signal/signaling can be used for data scheduling.

In an example, the foregoing DCI format containing the power saving signaling is used for uplink or downlink data scheduling of the UE, that is, the base station may indicate the power saving signaling to the UE when scheduling the UE data.

Figure 17:
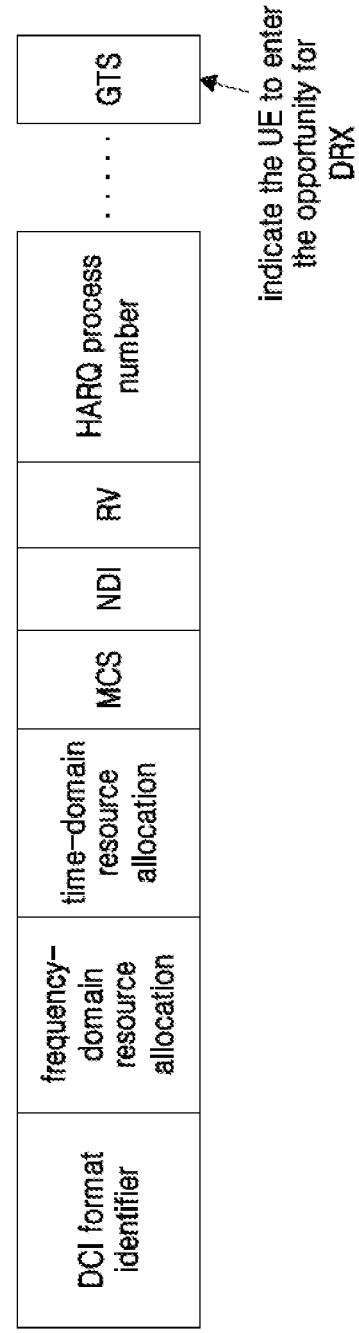
FIG. 17 is a schematic diagram of a configuration of a data scheduling DCI containing a GTS field according to an embodiment of the disclosure.

For example, FIG. 17 shows a schematic diagram of a configuration of data scheduling DCI containing a Go To Sleep (GTS) field. In FIG. 17, the DCI can be used to schedule a PDSCH/PUSCH, for example, the DCI contains the DCI field commonly used for data scheduling such as a DCI format identifier field (for distinguishing whether it is downlink scheduling or uplink scheduling), a frequency domain resource allocation field, a time domain resource allocation field, and a modulation coding scheme (MCS) field, New Data Indication (NDI) field, Redundancy Version (RV) field, HARQ process number. In addition to containing these DCI fields for data scheduling, the DCI also contains a GTS field for power saving, which is used to indicate the UE to stop the monitoring of the PDCCH, and enters the Opportunity-for-DRX from the On-Duration for the DRX, that is, the DCI format containing the GTS is only used for UEs configured with DRX.

Herein, the indication meaning of the GTS is similar to the GTSS for C-DRX described in the foregoing, except that the GTS power saving signaling in the foregoing is indicated by a physical layer signal, where the GTS power saving signaling here is carried by the DCI. The GTS is similar to the existing DRX Command MAC CE. More specifically, the GTS is used to indicate the UE to stop the drx-onDurationTimer and the drx-InactivityTimer. If the drx-RetransmissionTimer is still running, the UE still needs to continue monitoring the PDCCH scheduled to be retransmitted, and enters the Opportunity-for-DRX until the drx-RetransmissionTimer expires.

Optionally, the GTS field is 1 bit. When the indication value is "0", the UE should continue monitoring the PDCCH; when the indication value is "1", the UE should stop the drx-onDurationTimer and/or the drx-InactivityTimer, and then stop monitoring the PDCCH.

Optionally, when the UE is configured with a short DRX cycle, the GTS field is 2 bits. When the indication value is "00", the UE should continue monitoring the PDCCH; when the indication value is "01", the UE should stop the drx-onDurationTimer and/or drx-InactivityTimer, and enter the short DRX cycle; when the indication value is "10", the UE should stop the drx-onDurationTimer and/or drx-InactivityTimer, and enter the long DRX cycle; the indication value "11" is the reserved value.

Optionally, the GTS field is 2 bits. When the indication value is "00", the UE should continue monitoring the PDCCH; when the indication value is "01", the UE should stop the rx-onDurationTimer and/or drx-InactivityTimer; when the indication value is "10", the UE should stop the rx-onDurationTimer and/or drx-InactivityTimer, and continue sleeping in the On-Duration of the next DRX cycle, that is, does not start the rx-onDurationTimer at the starting position of the On-Duration of the next DRX cycle; the indication value "11" is a reserved value.

Figure 18:
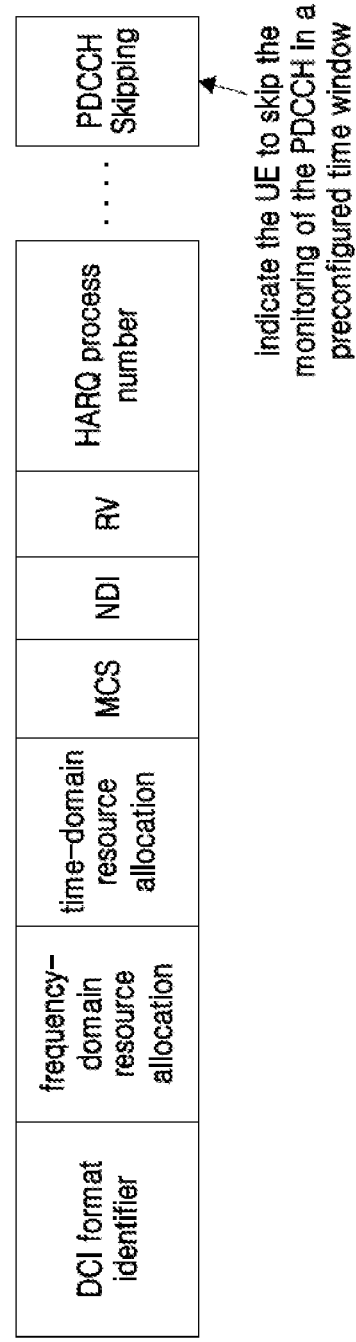
FIG. 18 is a schematic diagram of a configuration of a data scheduling DCI containing a PDCCH skipping field according to an embodiment of the disclosure.

For example, FIG. 18 shows a schematic diagram of a configuration of data scheduling DCI containing a PDCCH Skipping field. In FIG. 18, the DCI can be used to schedule a PDSCH/PUSCH, for example, the DCI contains the DCI field commonly used for data scheduling such as a DCI format identifier field (for distinguishing whether it is downlink scheduling or uplink scheduling), a frequency domain resource allocation field, a time domain resource allocation field, and an MCS field, an NDI field, an RV field, HARQ process number. In addition to containing these DCI fields for data scheduling, the DCI also contains a PDCCH skipping field for power saving, and the DCI format containing the PDCCH skipping is available for UEs that are not configured with DRX.

Herein, the indication meaning of PDCCH Skipping is similar to the PDCCH SS for non-C-DRX described in the foregoing, that is, for indicating the UE to skip the monitoring of the PDCCH within a predefined or preconfigured time window, except that the foregoing PDCCH skipping power saving signaling is indicated by a physical layer signal, wherein the PDCCH skipping power saving signaling is carried by the DCI.

Optionally, the time window is based on absolute time, or the number of PDCCH cycles, or the number of PDCCH occasions. For example, the length of the time window is N milliseconds (ms), N PDCCH cycles, or N PDCCH occasions, wherein N may be fixed by the system or may be system configurable.

Optionally, the PDCCH skipping field is 1 bit. When the indication value is "0", the UE should continue monitoring the PDCCH; when the indication value is "1", the UE should skip the monitoring of the PDCCH within a preconfigured time window.

In a preferred embodiment of the present disclosure, starting or stopping the monitoring of the PDCCH includes at least one of the following:
  skipping or starting the monitoring of the PDCCH within times window with different preconfigured lengths;
  skipping or starting the monitoring of the PDCCH of one or more preconfigured control resource sets;
  skipping or starting the monitoring of the PDCCH of one or more preconfigured search spaces;
  skipping or starting the monitoring of the PDCCH of one or more preconfigured DCI formats.

In a preferred embodiment of the present disclosure, the physical layer power saving signaling specifically indicates at least one of the following:
  indicating the UE to skip or start the monitoring of the PDCCH within times window with different preconfigured lengths;
  indicating the UE to skip or start the monitoring of the PDCCH of one or more preconfigured control resource sets;
  indicating the UE to skip or start the monitoring of the PDCCH of one or more preconfigured search spaces;
  indicating the UE to skip or start the monitoring of the PDCCH of one or more preconfigured DCI formats.

Optionally, the UE is configured with three different lengths of time windows, and the PDCCH skipping field is 2 bits. When the indication value is "00", the UE should continue monitoring the PDCCH; when the indication value is "01~11", the UE should skip the monitoring of the PDCCH within time windows of different lengths. In other words, different indication values correspond to time windows of different lengths, and the base station may dynamically indicate the length of the time window in which the UE skips the monitoring of the PDCCH. The 2 bits herein can also be extended to N bits in the same way.

Optionally, the UE simultaneously monitors two PDCCH DCI formats in the USS, wherein one PDCCH format is used to support a specific transmission mode, and the other PDCCH format is used to support Fallback transmission of the specific transmission mode, where the two PDCCH DCI formats have different sizes. The PDCCH skipping field is 2 bits. When the indication value is "00", the UE should continue monitoring the two PDCCH DCI formats. When the indication value is "01", the UE should only monitor the PDCCH format indicating the Fallback transmission, and stop monitoring the PDCCH format supporting the specific transmission mode; when the indication value is "10", the UE should stop the monitoring of the PDCCH in the preconfigured time window, that is, the monitoring of the PDCCH of the two PDCCH DCI formats is skipped; the indication value "11" is the reserved value. Herein, the different indication values correspond to a specific PDCCH format or a specific PDCCH format combination, and the base station may dynamically indicate the UE to skip PDCCH monitoring for a specific one or more PDCCH DCI formats within a preconfigured time window. The 2 bits herein can be extended to N bits in the same way.

Optionally, the UE is configured with two UE specific PDCCH search spaces, and the PDCCH skipping field is 2 bits. When the indication value is "00", the UE should continue monitoring the PDCCH of the two search spaces; when the indication value is "01", the UE should continue monitoring the PDCCH of the PDCCH search space with a large cycle, and stop monitoring the PDCCH of the PDCCH search space with a small cycle; when the indication value is "10", the UE should stop monitoring the PDCCH within the preconfigured time window, that is, skip the monitoring of the PDCCH of the two PDCCH search spaces; the indication value "11" is the reserved value. Herein, the different indication values correspond to a specific one or more PDCCH search spaces, and the base station may dynamically indicate the UE to skip the monitoring of the PDCCH in a specific one or more search spaces within a preconfigured time window. The 2 bits herein can be extended to N bits in the same way.

Optionally, the UE is configured with two UE specific CORESETs, and the PDCCH skipping field is 2 bits. When the indication value is "00", the UE should continue monitoring the PDCCHs on the two CORESETs; when the indication value is "01", the UE should continue monitoring the PDCCH of one of the CORESETs, for example, monitor the PDCCH based on the CORESET with the smallest index, and stop monitoring the PDCCH of the other CORESET; when the indication value is "10", the UE should stop the monitoring of the PDCCH within the preconfigured time window, that is, skip the monitoring of the PDCCH of both CORESETs; the indication value "11" is the reserved value. Herein, the different indication values correspond to a specific PDCCH format or a specific PDCCH format combination, and the base station may dynamically indicate the UE to skip the monitoring of the PDCCH on a specific one or more CORESETs within a preconfigured time window. The 2 bits herein can be extended to N bits in the same way.

Optionally, the foregoing power saving signaling such as the GTS and PDCCH skipping may also be contained within the ACK DCI or the NACK DCI of the PUSCH, the ACK DCI is the DCI for indicating that the PUSCH is successfully decoded by the base station, and the NACK DCI is the DCI used for indicating that the PUSCH is not successfully decoded by the base station.

The ACK/NACK DCI of the PUSCH may use the same load size as the DCI for scheduling the PUSCH. When designing the ACK/NACK DCI, one method is to contain a flag field in the DCI to indicate whether the DCI is the DCI for scheduling the PUSCH or the ACK/NACK DCI, this method adds an additional 1 bit to the load of the DCI for scheduling the PUSCH. Another method is to use the preserved value of a certain DCI field of the scheduled DCI of the PUSCH to indicate the ACK or NACK, for example, use a reserved value of a frequency domain resource scheduling field or the MCS field, this method can maintain the size of the load of the DCI for scheduling the PUSCH be unchanged.

Further, the dedicated DCI can also be used to carry the physical layer power saving signal/signaling.

In an example, the DCI format containing the power saving signaling is specifically used for the indication of the power saving signaling, and is not used for the data scheduling or the ACK/NACK indication of the PUSCH, and the UE may monitor the DCI based on the new defined RNTI value. The DCI contains at least one field of the following power saving signaling:

power saving signaling that indicates the UE to enter the On-Duration from the Opportunity-for-DRX, that is, to start the monitoring of the PDCCH;

power saving signaling that indicates the UE to enter the Opportunity-for-DRX from the On-Duration, that is, to stop the monitoring of the PDCCH;

power saving signaling that indicates the UE to skip the monitoring of the PDCCH within a preconfigured time window;

the power saving signaling indicates the DRX parameter configuration of the UE, e.g., it may indicate one of multiple preconfigurations of DRX parameter set, or indicate one of multiple preconfigurations of a certain DRX parameter. For example, it may indicate one of the multiple preconfigured DRX cycles, indicate one of the multiple preconfigured short/long DRX cycles, indicate to start or stop the short/long DRX cycles, indicate one of the multiple preconfigured drx-onDurationTimers, indicate one of the multiple preconfigured drx-InactivityTimer, and/or indicate one of the multiple preconfigured drx-RetransmissionTimers;

The power saving signaling indicates the PDCCH parameter configuration of the UE, e.g., it may indicate one of multiple preconfigurations of PDCCH parameter set, or indicate one of multiple preconfigurations of a certain PDCCH parameter. For example, it may indicate one of the multiple preconfigured CORESETs, indicate one of the multiple preconfigured PDCCH search spaces, indicate one of the multiple preconfigured Aggregation Levels (ALs), indicate one of multiple preconfigured PDCCH monitoring cycles, and/or indicate one of multiple preconfigured number of PDCCH blind detections.

The power saving signaling indicates the active BWP parameter configuration of the UE, e.g., it may indicate one of the multiple preconfigurations of BWP parameter set, or indicate one of the multiple preconfigurations of a certain BWP parameter. For example, indicate one of multiple preconfigured central carrier frequencies, indicate one of multiple preconfigured bandwidths, and/or indicate one of multiple preconfigured subcarrier spacings;

The power saving signaling indicates the MIMO parameter configuration of the UE, e.g., it may indicate one of multiple preconfigurations of MIMO parameter set, or indicate one of multiple preconfigurations of a certain MIMO parameter. For example, indicate one of multiple preconfigured number of MIMO layers, indicate one of the multiple preconfigured number of receive antennas, and/or indicate one of multiple preconfigured transmit antennas, and the like.

Each of the above-mentioned power saving signaling may correspond to a dedicated DCI field in the DCI, or may share a DCI field with other power saving signaling by jointly encoding.

In an example, the base station may dynamically configure PDCCH parameters by using a UE-specific DCI, for example, dynamically configure the CORESET, the PDCCH search space, the PDCCH AL, and/or the number of times of the PDCCH blind detections, etc., if the UE has not monitored any PDCCH in a predefined or preconfigured time window, then the UE should fall back to a default PDCCH parameter configuration to monitor the PDCCH. The default PDCCH parameter configuration is configured by the UE-specific RRC signaling. For example, the UE is dynamically configured to monitor the PDCCH on a certain PDCCH search space, and if no PDCCH has been monitored for a period of time after applying the new configuration, the UE should fall back to a default PDCCH search space and monitor the PDCCH.

In the existing system, the PDCCH parameters are configured through the RRC signaling. If the PDCCH parameters are configured through the UE-specific DCI signaling, the reliability of the DCI signaling is definitely worse than the RRC signaling. The above-mentioned fallback design is for mitigating the impact of such low reliability, that is, the condition where the UE-specific DCI signaling which are dynamically configured with the PDCCH parameters is lost by the UE.

Optionally, the above time window for the UE to determine whether to fall back to the default PDCCH parameter configuration is fixed (i.e. predefined) by the system. Optionally, the above time window for the UE to determine whether to fall back to the default PDCCH parameter configuration is possible to be configured by the system.

The time window herein can be the length of the absolute time, i.e., it is based on millisecond (ms). The time window may also be the number of the PDCCH cycles, i.e., it is based on PDCCH cycle. The time window may also be the number of the PDCCH occasions, i.e., it is based on PDCCH occasion.

In a preferred embodiment of the present disclosure, the physical layer power saving signal is carried by the DCI, and the DCI that carries the physical layer power saving signal is shared by a group of UEs, and monitoring, by the UE, the physical layer power saving signal includes:
  acquiring an index of a control signaling field corresponding to the UE;
  searching the control signaling field matched with the index from multiple control signaling fields, and determining the physical layer power saving signal according to the matched control signaling field.

Specifically, the UE is configured with a UE-group DCI format dedicated for power saving signal, a Radio Network Temporary Identity (RNTI) value for monitoring the DCI and a UE index for determining its own DCI field, then the UE monitors the UE-group DCI indicating the power saving signaling. After the UE has monitored the UE-group DCI, the UE decodes the indication value of the DCI field of the power saving signaling in the UE-group DCI, and performs the corresponding power saving operation at a predefined time after receiving the DCI, for example, skips the monitoring of the PDCCH in a preconfigured time window.

Herein, the UE monitors the UE-group DCI containing the power saving signaling field based on a new defined RNTI type, for example, the RNTI type is called PS-RNTI (Power Saving), and the value of the PS-RNTI can be specifically configured by the UE-specific RRC signaling.

Figure 19:
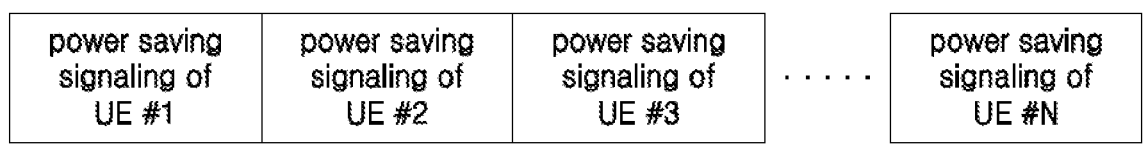
FIG. 19 is a schematic diagram of a configuration of a UE-group DCI that can be used to indicate the control signaling according to an embodiment of the disclosure.

FIG. 19 provides a schematic diagram showing the configuration of the UE-group DCI for indicating the power saving signaling. In FIG. 19, the DCI contains N power saving signaling fields, which respectively correspond to different UEs, that is, N UEs use the same RNTI value to simultaneously monitor the UE-group DCI, and the UE determines the position of the power saving signaling field to which the UE belongs based on the UE index configured by the high layer signaling, this design is similar to the DCI format 3/3A for PUCCH/PUSCH transmission power control in the LTE system, that is, the multiple of power saving signaling field of the UE is contained in the DCI. Optionally, N is specified by the system, for example N=8. Optionally, N is a system configurable value.

Preferably, after the UE-group DCI is configured, the UE should periodically monitor the UE-group DCI, and the cycle value is system configurable.

Optionally, after the UE-group DCI is configured, the UE should monitor the UE-group DCI in each available PDCCH Occasion.

In an example, the power saving signaling contained in the UE-group DCI is the PDCCH skipping, which is used to indicate the UE to skip the monitoring of the PDCCH within a predefined or preconfigured time window.

Optionally, the time window is based on absolute time, or the number of PDCCH cycles, or the number of PDCCH occasions. For example, the length of the time window is N milliseconds (ms), N PDCCH cycles, or N PDCCH occasions, wherein N may be fixed by the system or may be system configurable.

Optionally, the UE-group DCI is periodically monitored, and the time window for skipping the monitoring of the PDCCH is the same as the monitoring cycle of the UE-group DCI, and no signaling indication is required.

Optionally, the time window for skipping the monitoring of the PDCCH may be variable, for example, from the application time of the DCI signaling to the reception of next the UE-group DCI indicating the power saving signaling.

The foregoing description of the indication meaning of the PDCCH skipping field contained in the UE-specific DCI may also be used herein, that is, the PDCCH skipping field may be 1 bit, which is used to indicate the UE to continue monitoring the PDCCH or stop monitoring the PDCCH within a preconfigured time window. The PDCCH skipping field may also be 2 bits, and may be used to indicate the UE to continue monitoring the PDCCH or stop monitoring the PDCCH in different time windows of different lengths, and may also be used to indicate the UE to continue monitoring the PDCCH or skip the monitoring of the PDCCH for a specific one or more PDCCH DCI formats, and may also be used to indicate the UE to continue monitoring or skip the monitoring of the PDCCH on one or more specific PDCCH search spaces and may also be used to indicate the UE to continue or skip the monitoring of the PDCCH on one or more specific CORESETs.

The method for monitoring the PDCCH provided by the embodiment of the present application, when the UE monitors the physical layer power saving signal, starts or stops a monitoring of the PDCCH based on the monitoring result of the physical layer power saving signal. In this way, the UE starts or stops the monitoring of the PDCCH based on the monitored physical layer power saving signal. Compared with the prior art in which the UE needs to monitor the PDCCH in each DRX cycle, the resource overhead and power consumption of the UE are reduced, thereby reducing the power consumption of the UE.

Figure 20:
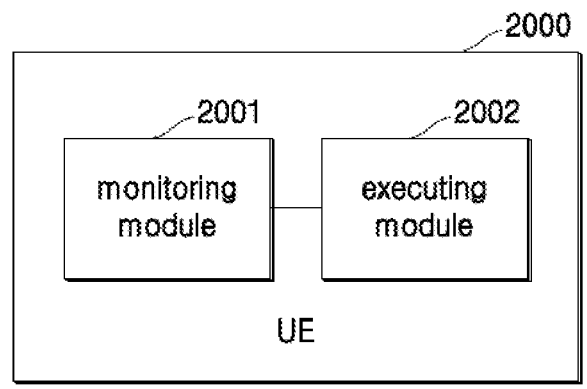
FIG. 20 is a schematic structural diagram of a UE according to an embodiment of the disclosure.

FIG. 20 is a schematic structural diagram of a UE according to an embodiment of the present disclosure. As shown in FIG. 20, the UE 2000 may include a monitoring module 2001 and an executing module 2002, wherein:

the monitoring module 2001 is configured to monitor a physical layer power saving signal;

the executing module 2003 is configured to start or stop a monitoring of a PDCCH based on a result of the monitoring of the physical layer power saving signal.

In a preferred embodiment of the present disclosure, the executing module is specifically configured to: when the UE is in an RRC connected mode and is configured with the DRX, and when the physical layer power saving signal is monitored, starting a drx-onDurationTimer at the starting position of the corresponding On-Duration.

In a preferred embodiment of the present disclosure, a first time gap is existed between the time of the UE receiving the physical layer power saving signal and the time of the UE starting the drx-onDurationTimer, and the UE determines the time domain position of the physical layer power saving signal based on the starting time of the On-Duration and the first time gap.

In a preferred embodiment of the present disclosure, the physical layer power saving signal corresponds to multiple DRX cycles, and the executing module is specifically configured to:

when the physical layer power saving signal is monitored, all of the drx-onDurationTimer are started at the starting positions of the On-Durations of the corresponding multiple DRX cycles;

and/or, when the physical layer power saving signal is not monitored, none of the drx-onDurationTimer are started at the starting positions of the on-duration of the corresponding multiple DRX cycles;

and/or, when the physical layer power saving signal is not monitored, the drx-onDurationTimer is not started at the starting position of the On-Duration within the first DRX cycle of the corresponding multiple DRX cycles.

In a preferred embodiment of the present disclosure, the physical layer power saving signal corresponds to multiple DRX cycles, and the multiple DRX cycles are configured as short DRX cycles.

In a preferred embodiment of the present disclosure, the UE further includes:

a stopping module configured to, when the UE is still in the DRX-on mode at the time of receiving the physical layer power saving signal, stop the UE monitoring the physical layer power saving signal.

In a preferred embodiment of the present disclosure, the executing module is specifically configured to stop the drx-onDurationTimer and/or drx-InactivityTimer when the UE is in the RRC connected mode and the DRX is configured.

In a preferred embodiment of the present disclosure, the physical layer power saving signal is carried by a dedicated signal sequence or a reference signal sequence;

the monitoring module is specifically configured to make the UE monitor the physical layer power saving signal based on a PDCCH search space.

In a preferred embodiment of the present disclosure, the executing module is specifically configured to: when the UE is in the RRC idle mode or the in-active mode and the physical layer power saving signal has been monitored, monitor the PO corresponding to the physical layer power saving signal.

In a preferred embodiment of the present disclosure, the UE further includes:

a measurement module, configured to measure the RSRP or the RSRQ based on the physical layer power saving signal corresponding to the PO.

In a preferred embodiment of the present disclosure, when the UE is in the RRC connected mode, the UE further includes:

a receiving module configured to receive the PDCCH or the PDSCH;

a discarding module configured to when a PRB occupied by the PDCCH or the PDSCH overlaps with the PRB occupied by the physical layer power saving signal corresponding to the UE in the RRC idle mode or the in-active mode, discard a receiving signal on the overlapped PRB.

In a preferred embodiment of the present disclosure, the executing module is specifically configured to monitor or skip the monitoring of the PDCCH when the UE is in the RRC connected mode and is not configured with the DRX in the time window corresponding to the physical layer power saving signal.

In a preferred embodiment of the present disclosure, the physical layer power saving signal has the corresponding PDCCH search space, the executing module is specifically configured to start or stop the monitoring of the PDCCH of the search space corresponding to the physical layer power saving signal.

In a preferred embodiment of the present disclosure, the physical layer power saving signal is carried by a dedicated signal sequence or a reference signal sequence, and the monitoring module is specifically configured to make the UE monitor the physical layer power saving signal based on the configuration information of the physical layer power saving signal.

The configuration information of the physical layer power saving signal includes at least one of the following parameters:

time domain resource position of the physical layer power saving signal;

frequency domain resource position of the physical layer power saving signal;

carrier BWP of the physical layer power saving signal;

subcarrier spacing of the physical layer power saving signal;

transmission beam of the physical layer power saving signal.

In a preferred embodiment of the present disclosure, the physical layer power saving signal is carried by the DCI;

the DCI that carries the physical layer power saving signal is further used to schedule a physical uplink shared channel (PUSCH) or a physical downlink shared channel (PDSCH) of the UE.

In a preferred embodiment of the present disclosure, the physical layer power saving signal is carried by the DCI, and the DCI carrying the physical layer power saving signal is shared by a group of UEs;

The monitoring module includes:

an index acquiring submodule, configured to acquire an index of a control signaling field corresponding to the UE;

a searching submodule, configured to search a control signaling field that matches the index from the multiple control signaling fields, and determine the physical layer power saving signal according to the matched control signaling field.

In a preferred embodiment of the present disclosure, starting or stopping the monitoring of the PDCCH includes at least one of the following:
  skipping or starting the monitoring of the PDCCH within times window with different preconfigured lengths;
  skipping or starting the monitoring of the PDCCH of one or more preconfigured control resource sets;
  skipping or starting the monitoring of the PDCCH of one or more preconfigured search spaces;
  skipping or starting the monitoring of the PDCCH of one or more preconfigured DCI formats.

In a preferred embodiment of the present disclosure, the physical layer power saving signaling specifically includes at least one of the following:
  indicating the UE to skip or start the monitoring of the PDCCH within times window with different preconfigured lengths;
  indicating the UE to skip or start the monitoring of the PDCCH of one or more preconfigured control resource sets;
  indicating the UE to skip or start the monitoring of the PDCCH of one or more preconfigured search spaces;
  indicating the UE to skip or start the monitoring of the PDCCH of one or more preconfigured DCI formats.

After the UE provided by the embodiment of the disclosure monitors the physical layer power saving signal, the UE starts or stops a monitoring of the PDCCH based on the monitoring result of the physical layer power saving signal. In this way, the UE starts or stops the monitoring of the PDCCH based on the monitored physical layer power saving signal. Compared with the prior art in which the UE needs to monitor the PDCCH in each DRX cycle, the resource overhead and power consumption of the UE are reduced, thereby reducing the power consumption of the UE.

A further embodiment of the present disclosure provides a UE, the UE includes: a processor; and a memory configured to store machine readable instructions that, when executed by the processor, causing the processor to perform the above method for monitoring the PDCCH.

Figure 21:
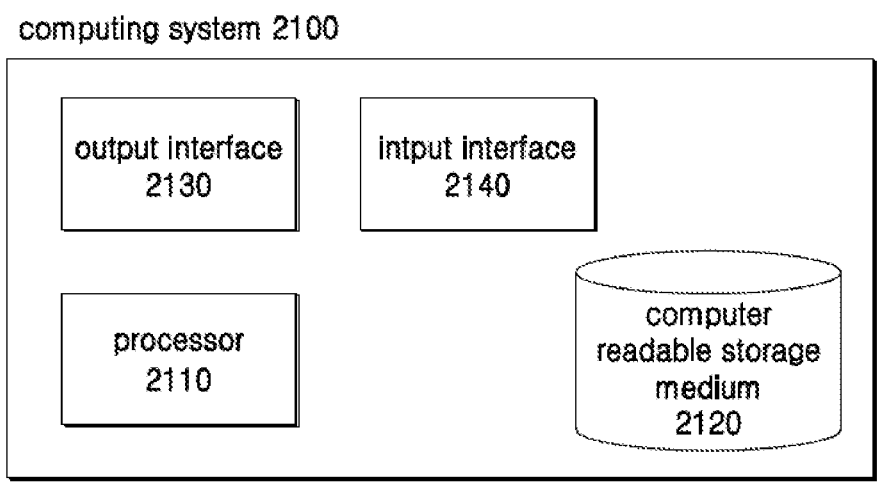
FIG. 21 is a block diagram of a computing system that can be used to implement the user equipment of the disclosure.

FIG. 21 is a block diagram that schematically illustrates a computing system that can be used to implement the user equipment of the present disclosure according to an embodiment of the present disclosure.

As shown in FIG. 21, a computing system 2100 includes a processor 2110, a computer readable storage medium 2120, an output interface 2130, and an input interface 2140. The computing system 2100 can perform the method described above with reference to FIG. 1 to configure a reference signal and perform data transmission based on the reference signal.

In particular, processor 2110 can include, for example, a general-purpose microprocessor, an signal set processor, and/or a related chipset and/or a dedicated microprocessor (e.g., an application specific integrated circuit (ASIC)), and the like. The processor 2110 may also include an onboard memory for caching purposes. The processor 910 may be a single processing unit or multiple processing units for performing different actions of the method flow described with reference to FIG. 1.

The computer readable storage medium 2120, for example, can be any medium that can contain, store, communicate, propagate or transport the signals. For example, a readable storage medium may include, but is not limited to, an electronic, magnetic, optical, electromagnetic, infrared, or semiconductor system, apparatus, device, or propagation medium. Specific examples of the readable storage medium include: a magnetic storage device such as a magnetic tape or a hard disk (HDD); an optical storage device such as a compact disk (CD-ROM); a memory such as a random-access memory (RAM) or a flash memory; and/or a wired/wireless communication link.

The computer readable storage medium 2120 can include a computer program, which can include codes/computer executable signals that, when executed by the processor 2110, cause the processor 2110 to perform, for example, the method flow described above in combination with FIG. 1 and any variations thereof.

The computer program can be configured to have, for example, computer program codes comprising a computer program module. For example, in an example embodiment, the codes in a computer program can include one or more program modules, including, for example, module 1, module 2 . . . . It should be noted that the division manner and number of modules are not fixed, and those skilled in the art may use suitable program modules or program module combinations according to actual conditions. When these program module combinations are executed by the processor 2110, the processor 2110 can perform, for example, the method flow described above in combination with FIG. 1 and any variations thereof.

According to an embodiment of the present disclosure, the processor 2110 may use the output interface 2130 and the input interface 2140 to perform the method flow described above in combination with FIG. 1 and any variations thereof.

It may be understood by those skilled in the art that computer program signals may be used to realize each block in structure diagrams and/or block diagrams and/or flowcharts as well as a combination of blocks in the structure diagrams and/or block diagrams and/or flowcharts. It may be understood by those skilled in the art that these computer program signals may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present disclosure may be alternated, changed, combined or deleted. Further, the operations, methods, other steps in the flows, measures and solutions already discussed in the present disclosure may also be alternated, changed, rearranged, decomposed, combined or deleted. Further, prior arts having the operations, methods, the steps in the flows, measures and solutions already discussed in the present disclosure may also be alternated, changed, rearranged, decomposed, combined or deleted.

The foregoing descriptions are merely preferred embodiments of the present disclosure. It should be noted that, for a person of ordinary skill in the art, various modifications and embellishments can be made without departing from the principle of the present disclosure. Such modifications and embellishments shall be regarded as falling into the protection scope of the present disclosure.

What is claimed is:
1. A method performed by a user equipment (UE) in a wireless communication system, the method comprising:

receiving downlink control information (DCI) scheduling a physical uplink shared channel (PUSCH) or a physical downlink shared channel (PDSCH), the DCI including a physical downlink control channel (PDCCH) monitoring field of 1 bit or 2 bits; and determining whether to skip PDCCH monitoring based on a value of the PDCCH monitoring field, wherein a '0' value for the 1 bit of the PDCCH monitoring field indicates no skipping in the PDCCH monitoring, and a '1' value for the 1 bit of the PDCCH monitoring field indicates skipping the PDCCH monitoring within a time window, and wherein a '00' value for the 2 bits indicates no skipping in the PDCCH monitoring, each of a '01' value, a '10' value, and a '11' value indicates skipping the PDCCH monitoring for different lengths of time windows.

2. The method of claim 1, further comprising:

receiving configuration information for a power saving operation;

monitoring a power saving signal based on the configuration information; and determining whether to start a discontinuous reception (drx)-on duration timer based on the power saving signal, wherein the power saving signal is not monitored during a minimum time gap before the starting of the drx-on duration timer, and wherein the minimum time gap is determined based on UE capability information or subcarrier spacing (SCS).

3. The method of claim 2, wherein the power saving signal is carried in DCI monitored based on a Power Saving-Radio Network Temporary Identifier (PS-RNTI), and wherein the PS-RNTI is configured by radio resource control (RRC) signaling.

4. The method of claim 3, wherein the DCI monitored based on the PS-RNTI is UE specific DCI for the UE or group specific DCI for a plurality of UEs in which the UE is included.

5. The method of claim 4, wherein the group specific DCI comprises N power saving signaling fields, and a position of a power saving signaling field for the UE is determined by high layer signaling.

6. The method of claim 5, wherein the N power saving signaling fields are indexed such as to respectively correspond to the plurality of UEs.

7. The method of claim 2, wherein the configuration information comprises at least one of information related to the power saving signal, a time gap between a point of monitoring the power saving signal and a point of monitoring the PDCCH, a size of the DCI, information related to bandwidth part (BWP) to be activated, or information related to search space.

8. The method of claim 2, wherein the power saving signal includes a wake up signal.

9. A user equipment (UE) in a wireless communication system, the UE comprising:

a transceiver; and at least one processor coupled with the transceiver and configured to:

receive downlink control information (DCI) scheduling a physical uplink shared channel (PUSCH) or a physical downlink shared channel (PDSCH), the DCI including a physical downlink control channel (PDCCH) monitoring field of 1 bit or 2 bits; and determine whether to skip PDCCH monitoring based on a value of the PDCCH monitoring field, wherein a '0' value for the 1 bit of the PDCCH monitoring field indicates no skipping in the PDCCH monitoring, and a '1' value for the 1 bit of the PDCCH monitoring field indicates skipping the PDCCH monitoring within a time window, and wherein a '00' value for the 2 bits indicates no skipping in the PDCCH monitoring, each of a '01' value, a '10' value, and a '11' value indicates skipping the PDCCH monitoring for different lengths of time windows.

10. The UE of claim 9, wherein the at least one processor is further configured to:

receive configuration information for a power saving operation;

monitor a power saving signal based on the configuration information; and determine whether to start a discontinuous reception (drx)-on duration timer based on the power saving signal, wherein the power saving signal is not monitored during a minimum time gap before the starting of the drx-on duration timer, and wherein the minimum time gap is determined based on UE capability information or subcarrier spacing (SCS).

11. The UE of claim 10, wherein the power saving signal is carried in DCI monitored based on a Power Saving-Radio Network Temporary Identifier (PS-RNTI), and wherein the PS-RNTI is configured by radio resource control (RRC) signaling.

12. The UE of claim 11, wherein the DCI monitored based on the PS-RNTI is UE specific DCI for the UE or group specific DCI for a plurality of UEs in which the UE is included.

13. The UE of claim 12, wherein the group specific DCI comprises N power saving signaling fields, and a position of a power saving signaling field for the UE is determined by high layer signaling.

14. The method of claim 13, wherein the N power saving signaling fields are indexed such as to respectively correspond to the plurality of UEs.

15. The UE of claim 10, wherein the configuration information comprises at least one of information related to the power saving signal, a time gap between a point of monitoring the power saving signal and a point of monitoring the PDCCH, a size of the DCI, information related to bandwidth part (BWP) to be activated, or information related to search space.

16. The UE of claim 10, wherein the power saving signal includes a wake up signal.

* * * * *